United States Patent
Chen

(10) Patent No.: US 9,826,398 B2
(45) Date of Patent: Nov. 21, 2017

(54) SECURE ESTABLISHMENT METHOD, SYSTEM AND DEVICE OF WIRELESS LOCAL AREA NETWORK

(71) Applicant: Huawei Technologies Co., Ltd., Shenzhen (CN)

(72) Inventor: Jing Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 14/550,629

(22) Filed: Nov. 21, 2014

(65) Prior Publication Data

US 2015/0082393 A1  Mar. 19, 2015

Related U.S. Application Data

(63) Continuation of application No. PCT/CN2013/076088, filed on May 22, 2013.

(30) Foreign Application Priority Data

May 23, 2012  (CN) .......................... 2012 1 0161427

(51) Int. Cl.
*G06F 7/04* (2006.01)
*H04W 12/04* (2009.01)
(Continued)

(52) U.S. Cl.
CPC .............. *H04W 12/04* (2013.01); *H04L 63/06* (2013.01); *H04W 76/02* (2013.01); *H04W 84/12* (2013.01);
(Continued)

(58) Field of Classification Search
CPC ........ H04L 63/06; H04W 12/04; H04W 76/02
(Continued)

(56) References Cited

U.S. PATENT DOCUMENTS 7,352,866 B2 * 4/2008 Panjwani et al. ............. 380/270
8,452,017 B2 * 5/2013 Sherkin ................. H04L 9/3066
380/283
(Continued)

FOREIGN PATENT DOCUMENTS

CN    1512708 A    7/2004
CN    1720688 A    1/2006
(Continued)

OTHER PUBLICATIONS

"Draft Supplement to Standard for Telecommunications and Information Exchange Between Systems—LAN/MAN Specific Requirements—Part 11: Wireless Medium Access Control (MAC) and physical layer (PHY) specifications: Specification for Enhanced Security," IEEE Std 802.11i/D2.0, pp. i-117, Institute of Electrical and Electronics Engineers, New York, New York (Mar. 2002).

*Primary Examiner* — Tae Kim
*Assistant Examiner* — Peiliang Pan
(74) *Attorney, Agent, or Firm* — Leydig, Voit & Mayer, Ltd.

(57) ABSTRACT

The embodiments of the present invention provide a secure establishment method, system and device of a wireless local area network. The method includes: acquiring, by a UE, a first key; the first key is a shared key of the UE and a network element equipment in a mobile communication network to which the UE is accessed when implementing air interface security, or is derived according to the shared key; deriving, by the UE, according to the first key and a derivation parameter to acquire a derivation key; establishing, by the UE, according to the derivation key, secure connection with a WLAN node acquiring a derivation key, wherein the derivation key acquired by the WLAN node is the same as the derivation key acquired by the UE.

20 Claims, 7 Drawing Sheets

(51) Int. Cl.
*H04W 84/12* (2009.01)
*H04L 29/06* (2006.01)
*H04W 76/02* (2009.01)
*H04W 12/06* (2009.01)

(52) U.S. Cl.
CPC ....... *H04L 2463/061* (2013.01); *H04W 12/06* (2013.01)

(58) Field of Classification Search
USPC .............................. 726/2, 3; 713/170; 380/44
See application file for complete search history.

(56) References Cited

U.S. PATENT DOCUMENTS

| | | | | |
|---|---|---|---|---|
| 8,594,628 | B1* | 11/2013 | Schroeder | H04L 63/0846 370/331 |
| 2003/0093663 | A1* | 5/2003 | Walker | 713/150 |
| 2003/0235305 | A1 | 12/2003 | Hsu | |
| 2004/0139320 | A1 | 7/2004 | Shinohara | |
| 2006/0178131 | A1 | 8/2006 | Huotari et al. | |
| 2007/0226499 | A1 | 9/2007 | Zhang | |
| 2007/0269048 | A1 | 11/2007 | Hsu | |
| 2008/0076392 | A1 | 3/2008 | Khetawat et al. | |
| 2008/0101400 | A1 | 5/2008 | Auterinen | |
| 2008/0294891 | A1* | 11/2008 | Ram Ov et al. | 713/158 |
| 2009/0043901 | A1* | 2/2009 | Mizikovsky | H04L 63/06 709/229 |
| 2009/0313472 | A1* | 12/2009 | Guccione et al. | 713/171 |
| 2010/0016001 | A1 | 1/2010 | Yang | |
| 2010/0138661 | A1 | 6/2010 | Tsai et al. | |
| 2011/0235802 | A1 | 9/2011 | Kokkinen et al. | |
| 2012/0224485 | A1* | 9/2012 | Payyappilly | H04L 12/4633 370/235 |

FOREIGN PATENT DOCUMENTS

| | | |
|---|---|---|
| CN | 102595405 A | 7/2012 |
| EP | 1515516 A1 | 3/2005 |

* cited by examiner

SECURE ESTABLISHMENT METHOD, SYSTEM AND DEVICE OF WIRELESS LOCAL AREA NETWORK

CROSS-REFERENCE TO RELATED APPLICATIONS

This application is a continuation of International Patent Application No. PCT/CN2013/076088, filed on May 22, 2013, which claims the priority of Chinese Application No. 201210161427.0, filed on May 23, 2012, both of which are hereby incorporated by reference in their entireties.

FIELD OF THE INVENTION

The embodiments of the present invention relate to the technical field of communications, and particularly, to a secure establishment method, system and device of a wireless local area network.

BACKGROUND OF THE INVENTION

With the widespread popularity of user equipments (UE) such as internet-enabled intelligent terminals, people begin to use the UEs to perform a large amount of data services. In recent years, the data service traffic of operator networks is growing fast. In order to adapt to this trend, operators and equipment manufacturers begin to actively consider a variety of methods for reducing the burden of the operator networks. A wireless local area network (WLAN) is a wireless access technology, and a WLAN technology may be used for providing a higher transmission rate and is considered as beneficial supplement to wireless wide area networks deployed by the operators. In airports, manufacturers and other hot spots, the WLAN technology allows users to perform the data services via WLAN, thereby reducing the burden of operator core networks.

At present, many operators have deployed WLAN networks in airports, stations, hotels and other hot spots to offload the data traffic of UEs. In these existing deployment solutions, the operators generally deploy WLAN into an open mode, and any UE may be accessed to a WLAN node. When the UE is to be accessed to the internet, the WLAN node redirects the UE to a specific web page, and the UE may be accessed to the internet after a user corresponding to the UE inputs a correct user name/password on the web page.

Since the WLAN node works under the open node, no secure connection is established between the UE and the WLAN node, and data between the UE and the WLAN node is transmitted in a plaintext mode, thus resulting in poor communication security between the UE and the WLAN node.

SUMMARY OF THE INVENTION

The embodiments of the present invention provide a secure establishment method, system and device of a wireless local area network, which are used for compensating for the defect in the prior art of poor communication security between UE and a WLAN and improving the security between the UE and the WLAN.

On one hand, the embodiments of the present invention provide a secure establishment method of a wireless local area network, including:

a user equipment acquires a first key; the first key is a shared key of the user equipment and a network element equipment in a mobile communication network to which the user equipment is accessed when implementing air interface security, or is derived according to the shared key of the user equipment and the network element equipment in the accessed mobile communication network when implementing the air interface security;

the user equipment derives according to the first key and a derivation parameter to acquire a derivation key; the derivation parameter is determined by means of consultation between the user equipment and the network element equipment;

the user equipment establishes, according to the derivation key, secure connection with a wireless local area network node acquiring a derivation key, wherein the derivation key acquired by the wireless local area network node is the same as the derivation key acquired by the user equipment.

On the other hand, the embodiments of the present invention further provide a secure establishment method of a wireless local area network, including:

a wireless local area network node receives an identifier of a user equipment sent by the user equipment;

the wireless local area network node sends a key request message carrying the identifier of the user equipment to network element equipment in a mobile communication network to which the user equipment is accessed;

the wireless local area network node receives a derivation key corresponding to the identifier of the user equipment, sent by the network element equipment; the derivation key is acquired by deriving according to a first key and a derivation parameter by the network element equipment, and the first key is a shared key of the user equipment and the network element equipment when implementing air interface security, or is derived according to the shared key of the user equipment and the network element equipment when implementing the air interface security; the derivation parameter is determined by means of consultation between the user equipment and the network element equipment;

the wireless local area network node establishes, based on the derivation key, secure connection with the user equipment acquiring a derivation key, wherein the derivation key acquired by the user equipment is the same as the derivation key acquired by the wireless local area network node.

On still another hand, the embodiments of the present invention further provide a secure establishment method of a wireless local area network, including:

a network element equipment in a mobile communication network to which a user equipment is accessed receives a key request message sent by a wireless local area network node; the key request message carries an identifier of the user equipment;

the network element equipment acquires a corresponding derivation key according to the identifier of the user equipment in the key request message; the derivation key is acquired by deriving according to a first key and a derivation parameter by the network element equipment; the first key is a shared key of the network element equipment and the user equipment when implementing air interface security, or is derived according to the shared key of the network element equipment and the user equipment when implementing the air interface security; the derivation parameter is determined by means of consultation between the network element equipment and the user equipment;

the network element equipment sends the derivation key to the wireless local area network node, for the wireless local area network node to establish, based on the derivation key, secure connection with the user equipment acquiring a derivation key, wherein the derivation key acquired by the user equipment is the same as the derivation key sent by the network element equipment and received by wireless local area network node.

On still another hand, the embodiments of the present invention further provide a secure establishment method of a wireless local area network, including:

a user equipment acquires a first key; the first key is a shared key of the user equipment and first network element equipment in a mobile communication network to which the user equipment is accessed when implementing air interface security, or is derived according to the shared key of the user equipment and the first network element equipment in the accessed mobile communication network when implementing the air interface security;

the user equipment derives according to an identifier of the user equipment and the first key to generate an authentication user name and an authentication credential;

the user equipment implements extensible authentication protocol authentication with the first network element equipment or a second network element equipment according to the authentication user name and the authentication credential; the second network element equipment is another network element equipment excluding the first network element equipment in the mobile communication network; the second network element equipment acquires the authentication user name and the authentication credential from the first network element equipment; or the second network element equipment acquires the identifier of the user equipment and the first key from the first network element equipment, and derives according to the identifier of the user equipment and the first key to generate the authentication user name and the authentication credential;

the user equipment establishes secure connection with the wireless local area network node after the authentication is completed.

On still yet another hand, the embodiments of the present invention further provide a secure establishment method of a wireless local area network, including:

a first network element equipment in a mobile communication network to which a user equipment is accessed acquires an authentication user name and an authentication credential of the user equipment; the authentication user name and the authentication credential are generated by deriving according to an identifier of the user equipment and a first key; the first key is a shared key of the user equipment and the first network element equipment or second network element equipment in the accessed mobile communication network when implementing air interface security, or is derived according to the shared key of the user equipment and the first network element equipment or the second network element equipment when implementing the air interface security;

the first network element equipment implements extensible authentication protocol authentication with the user equipment according to the authentication user name and the authentication credential;

the first network element equipment sends authentication complete to the wireless local area network node after the success of the extensible authentication protocol authentication, for indicating the wireless local area network node to establish secure connection with the user equipment.

On still yet another hand, the embodiments of the present invention further provide a user equipment, including:

an acquiring module, configured to acquire a first key; the first key is a shared key when implementing air interface security with a network element equipment in a mobile communication network to which the user equipment is accessed, or is derived according to the shared key of the user equipment and the network element equipment in the accessed mobile communication network when implementing the air interface security;

a deriving module, configured to derive according to the first key acquired by the acquiring module and a derivation parameter to acquire a derivation key; the derivation parameter is determined by means of consultation between the user equipment and the network element equipment;

an establishing module, configured to establish secure connection with a wireless local area network node acquiring a derivation key according to the derivation key derived by the deriving module, wherein the derivation key acquired by the wireless local area network node is the same as the derivation key acquired by the user equipment.

On still yet another hand, the embodiments of the present invention further provide wireless local area network node equipment, characterized by including:

a receiving module, configured to receive an identifier of a user equipment sent by the user equipment;

a sending module, configured to send a key request message carrying the identifier of the user equipment, received by the receiving module, to network element equipment in a mobile communication network to which the user equipment is accessed;

the receiving module is further configured to, receive a derivation key corresponding to the identifier of the user equipment, sent by the network element equipment; the derivation key is acquired by deriving according to a first key and a derivation parameter by the network element equipment, wherein the first key is a shared key of the user equipment and the network element equipment when implementing air interface security, or is derived according to the shared key of the user equipment and the network element equipment in the accessed mobile communication network when implementing the air interface security; the derivation parameter is determined by means of consultation between the user equipment and the network element equipment;

an establishing module, configured to establish secure connection with the user equipment acquiring a derivation key based on the derivation key received by the receiving module, wherein the derivation key acquired by the user equipment is the same as the derivation key acquired by the wireless local area network node.

On still yet another hand, the embodiments of the present invention further provide a network element equipment, located in a mobile communication network to which user equipment is accessed, including:

a receiving module, configured to receive a key request message sent by a wireless local area network node; the key request message carries an identifier of the user equipment;

an acquiring module, configured to acquire a corresponding derivation key according to the identifier of the user equipment in the key request message, received by the receiving module; the derivation key is acquired by deriving according to a first key and a derivation parameter; the first key is a shared key when implementing air interface security with the user equipment, or is derived according to the shared key when implementing the air interface security with the user equipment; the derivation parameter is determined by consultation with the user equipment; a sending module, configured to send the derivation key acquired by the acquiring module to the wireless local area network node, for the wireless local area network node to establish, based on the derivation key, secure connection with the user equipment acquiring a derivation key, wherein the derivation key acquired by the user equipment is the same as the derivation key sent by the network element equipment and received by wireless local area network node.

On still yet another hand, the embodiments of the present invention further provide a secure establishment system of a wireless local area network, including the above-mentioned user equipment, the wireless local area network node equipment and the network element equipment.

On still yet another hand, the embodiments of the present invention further provide a user equipment, including:

an acquiring module, configured to acquire a first key; the first key is a shared key of the user equipment and a first network element equipment in a mobile communication network to which the user equipment is accessed when implementing air interface security, or is derived according to the shared key of the user equipment and the first network element equipment in the accessed mobile communication network when implementing the air interface security;

a generating module, configured to derive according to an identifier of the user equipment and the first key of the acquiring module to generate an authentication user name and an authentication credential;

an authenticating module, configured to implement extensible authentication protocol authentication with the first network element equipment or second network element equipment according to the authentication user name and the authentication credential generated by the generating module; the second network element equipment is another network element equipment excluding the first network element equipment in the mobile communication network; the second network element equipment acquires the authentication user name and the authentication credential from the first network element equipment; or the second network element equipment acquires the identifier of the user equipment and the first key from the first network element equipment, and derives according to the identifier of the user equipment and the first key to generate the authentication user name and the authentication credential;

an establishing module, configured to establish secure connection with the wireless local area network node after the authenticating module completes the extensible authentication protocol authentication.

On still yet another hand, the embodiments of the present invention further provide a network element equipment, located in a mobile communication network to which a user equipment is accessed, including:

an acquiring module, configured to acquire an authentication user name and an authentication credential of the user equipment; the authentication user name and the authentication credential are generated by deriving according to an identifier of the user equipment and a first key; the first key is a shared key of the user equipment and the network element equipment or second network element equipment when implementing air interface security, or is derived according to the shared key of the user equipment and the network element equipment or the second network element equipment when implementing the air interface security;

an authenticating module, configured to implement extensible authentication protocol authentication with the user equipment according to the authentication user name and the authentication credential;

a sending module, configured to send authentication complete to the wireless local area network node after the success of the extensible authentication protocol authentication, for indicating the wireless local area network node to establish secure connection with the user equipment.

On still yet another hand, the embodiments of the present invention further provide a secure establishment system of a wireless local area network, including the above-mentioned user equipment and the network element equipment.

According to the secure establishment method, system and device of the wireless local area network of the embodiments of the present invention, secure connection may be established between UE and the WLAN node based on the derivation key, wherein the derivation key is acquired by deriving according to the first key and the derivation parameter, and the first key is the shared key of the user equipment and the network element equipment in the accessed mobile communication network when implementing the air interface security, or is derived according to the shared key; or the UE derives according to the identifier of the UE and the first key to generate the authentication user name and an authentication password; the UE performs EAP authentication with the network element equipment in the mobile communication network to which the UE is accessed according to the authentication user name and the authentication password, and the secure connection is established between the UE and the WLAN node after the authentication is completed. By adopting the above-mentioned technical solutions of the embodiments of the present invention, the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solutions of the embodiments of the present invention, the secure connection may be established between the UE and the WLAN node, thus improving the communication security between the UE and the WLAN node.

DETAILED DESCRIPTION OF THE EMBODIMENTS

In order that the purposes, technical solutions and advantages of the embodiments of the present invention are clearer, a clear and complete description of the technical solutions in the embodiments of the present invention will be given below, in combination with the accompanying drawings in the embodiments of the present invention. Apparently, the embodiments described are merely a part, but not all, of the embodiments of the present invention. All of other embodiments, acquired by those of ordinary skill in the art based on the embodiments in the present invention without any creative effort, fall into the protection scope of the present invention.

Figure 1:
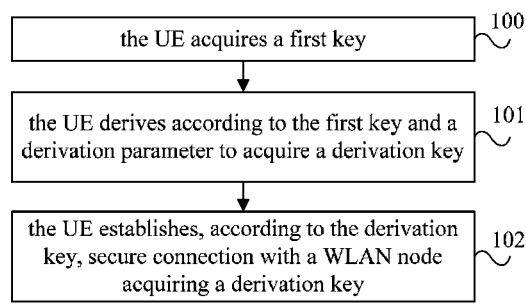
FIG. 1 is a flowchart of a secure establishment method of a WLAN provided by the present invention.

FIG. 1 is a flowchart of a secure establishment method of a WLAN provided by an embodiment of the present invention. As shown in FIG. 1, the executive body of the secure establishment method of the WLAN of this embodiment is a UE. The secure establishment method of the WLAN of this embodiment may specifically include the following steps:

100, the UE acquires a first key;

in this embodiment, the first key is a shared key of the UE and a network element equipment in a mobile communication network to which the UE is accessed when implementing air interface security, or is derived according to the shared key of the UE and the network element equipment in the mobile communication network to which the UE is accessed when implementing the air interface security.

101, the UE derives according to the first key and a derivation parameter to acquire a derivation key;

wherein the derivation parameter is determined by the UE and the network element equipment.

102, the UE establishes, according to the derivation key, secure connection with a WLAN node acquiring a derivation key.

The derivation key acquired by the WLAN node is the same as the derivation key acquired by the UE. Namely, when the technical solution of this embodiment is implemented, it is necessary for the WLAN node to acquire the derivation key. For example, the WLAN node may request to acquire the derivation key from the network element equipment, while the network element equipment derives according to the first key and the derivation parameter to acquire the derivation key. In this way, the UE and the WLAN node may both acquire the derivation key, and the secure connection is established between the UE and the WLAN node based on the derivation key.

In this embodiment, the UE and the network element equipment may both acquire the derivation parameter, and it may be considered that the derivation parameter is determined by the consultation of the both. There may be specifically one or multiple derivation parameters. For example, the derivation parameter may be appointed by the UE and the network element equipment in advance, or is consulted online when deriving the derivation key. For example, the UE may provide some parameters to serve as the derivation parameters, and then notifies the network element equipment of the derivation parameters. Or, the network element equipment provides some parameters to serve as the derivation parameters, and then notifies the UE of the derivation parameters. Or, the UE provides some parameters or the network element equipment provides some parameters, then the UE and the network element equipment exchange the respectively provided parameters, and, at this time, the corresponding derivation parameters are composed of the parameters provided by the UE and the parameters provided by the network element equipment.

According to the secure establishment method of the wireless local area network of this embodiment, by adopting the above-mentioned technical solution, the secure connection may be established between the UE and the WLAN node based on the derivation key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Optionally, on the basis of the technical solution of the embodiment as shown in the above-mentioned FIG. 1, the following optional technical solutions may also be included to form optional embodiments of the embodiment as shown in FIG. 1.

In the optional embodiments of the embodiment as shown in FIG. 1, prior to step 102, the embodiment further includes: the UE sends an identifier of the UE to the WLAN node, for the WLAN node to request the network element equipment to acquire a derivation key corresponding to the UE according to the identifier of the UE.

Optionally, in the optional embodiments of the embodiment as shown in FIG. 1, step 101 may specifically include: the UE derives according to the first key and the derivation parameter to acquire a second key, namely at this time, the derivation key is the second key. For example, the UE may specifically adopt the following manner to derive to acquire the second key: $Kw=KDF(K, \text{derivation parameter})$; wherein $Kw$ refers to the second key, $K$ refers to the first key, the derivation parameter is determined by means of consultation between the UE and the network element equipment, $KDF(,)$ is a key derivation function (key derivation function; KDF) function, $K$ and the derivation parameter are used as the inputs of the function, and $Kw$ is used as the output of the function.

For example, in the embodiment of the present invention, the second key may be set as $Kw=\text{HMAC-SHA256}(K, \text{"WPA/WPA2 Personal"})$; a hashed message authentication code (Hashed Message Authentication Code; HMAC) is a cryptographic algorithm, HMAC-SHA256 (,) expresses a cryptographic algorithm function, and "WPA/WPA2 Personal" expresses an appointed derivation parameter used for deriving the second key $Kw$ and is used for identifying that the second key $Kw$ is used by the UE and the WLAN network to establish WLAN secure connection in a WPA/

WPA2 personal manner. Establishing the WLAN secure connection in the WPA/WPA2 personal manner is a method of establishing the WLAN secure connection by the UE and the WLAN node based on a pre-shared key manner, and reference may be made to related prior art for details which will not be repeated redundantly herein. In this embodiment, the pre-shared key between the UE and the WLAN network is the second key Kw. In this embodiment, K still refers to the first key.

At this time, the corresponding step 102 may be specifically as follows: the UE establishes the secure connection with the WLAN node according to the second key. By adopting the technical solution, the second key is acquired by the UE by deriving according to the first key and the derivation parameter determined by consultation with the UE, which may be ensured that different UE has different second keys and each UE may establish the secure connection with the WLAN node based on the corresponding second key thereof, such that the secure connection between the UE and the WLAN node may be effectively ensured.

Optionally, in the optional embodiments of the embodiment as shown in FIG. 1, step 101 may specifically include: the UE derives according to the first key and the derivation parameter to acquire the second key; then the UE derives according to the second key and an identifier of the WLAN node to acquire a third key, wherein when beginning to be accessed to the WLAN node, the UE may acquire the identifier of the WLAN node. In this embodiment, on a network element equipment side, the network element equipment may also acquire the identifier of the WLAN node and derive according to the second key and the identifier of the WLAN node to acquire the third key. For example, when requesting the key from the network element equipment, the WLAN node may send a key request message carrying the identifier of the UE and the identifier of the WLAN node to the network element equipment. In this way, the network element equipment may know that it is necessary to derive the third key according to the second key and the identifier of the WLAN node and send the third key to the WLAN node. In this way, the third key may be acquired at both of the UE side and the WLAN node side. For example, when the identifier of the WLAN node is a service set identifier (SSID) of the WLAN node, the third key may be derived in the following manner: the third key= HMAC-SHA256 (Kw, SSID of the WLAN node). HMAC-SHA256 (,) expresses a cryptographic algorithm function, and Kw expresses the second key. At this time, the corresponding step 102 may be specifically as follows: the UE establishes the secure connection with the WLAN node according to the third key. By adopting the technical solution, it may be ensured that when being accessed to the WLAN from different WLAN nodes, the same UE adopts different third keys. Compared with the above-mentioned manner that each UE may establish the secure connection with the WLAN node based on the corresponding second key thereof, the security of the connection established between the UE and the WLAN node may be further reinforced. Of course, in the derivation process of the third key, the WLAN node may send the identifier to the network element equipment, but this is not the only method for the network element equipment to acquire the identifier of the WLAN node. The network element equipment may acquire the identifier of the WLAN node by virtue of other methods. For example, the network element equipment may receive a key request message carrying the identifier of the UE, sent by the WLAN node, acquire the IP address of the WLAN node and acquire the identifier of the WLAN node according to the IP address of the WLAN node. In practical application, the network element equipment may also acquire the identifier of the WLAN node by adopting other methods. In addition, the WLAN node may also be an MAC address of the WLAN node or other identity information capable of uniquely identifying the WLAN node.

Optionally, in the optional embodiments of the embodiment as shown in FIG. 1, the identifier of the UE is a media access control (MAC) address of the UE, an international mobile subscriber identification number (IMSI) of the UE, a temperate mobile subscription identity (TMSI) of the UE, a packet temperate mobile subscription identity (P-TMSI) of the UE, a globally unique temporary identity (GUTI) of the UE, a system architecture evolution temporary mobile subscriber identity (S-TMSI) of the UE, a radio network temporary identifier (RNTI) of the UE, or a mobile station international integrated services digital network number (MSISDN) of the UE.

Further optionally, when the identifier of the UE is anything excluding the above-mentioned MAC address, the network element equipment may acquire the identifier of the UE by itself, and at this time, the UE does not need to send the identifier of the UE to the network element equipment. When the identifier of the UE is the MAC address of a WLAN interface of the UE (or other identifier(s) of the UE which can not be acquired by the network element from itself), prior to that "the UE derives according to the second key and the identifier of the WLAN node sent by the network element equipment to acquire the third key", the above-mentioned method further includes: the UE sends the identifier of the UE to the network element equipment. Specifically, the UE may send the identifier of the UE to the network element equipment in an encryption manner.

Optionally, in the optional embodiments of the embodiment as shown in FIG. 1, the mobile communication network may be a global system for mobile communication (GSM) network, a universal mobile telecommunications system (UMTS), a long term evolution (LTE) system, a code division multiple access (CDMA) network or a general packet radio service (GPRS) network; the network element equipment may be a base station controller (BSC) of the GSM network, a radio network controller (RNC) of the UMTS, a serving GPRS support node (SGSN) of the GPRS network, a mobility management entity (MME) of the LTE system, or a base station (e.g., eNB in the LTE system).

Optionally, in the optional embodiments of the embodiment as shown in FIG. 1, for the first key in step 100 in the above-mentioned embodiment, for example, when the mobile communication network is the GSM network, the corresponding network element equipment is the BSC, the shared key between the UE and the BSC is Kc. The first key K may be Kc or is a key derived by the key derivation function according to Kc, for example, K=KDF (Kc, "K for WLAN").

When the mobile communication network is the GPRS network, the corresponding network element equipment is the SGSN in a core network node, the shared key between the UE and the SGSN is Kc, and the first key K may be Kc or a key derived according to Kc.

When the mobile communication network is the UMTS, the corresponding network element equipment is the RNC, the shared key between the UE and the SGSN is CK/IK. The first key K may be any key in CK/IK, or a key derived according to CK or IK or the both. For example, the first key K may be set as K=CK∥IK.

When the mobile communication network is the LTE, the corresponding network element equipment is the MME in the core network node, and the shared key between the UE and the MME is Kasme, Knas.int or Knas.enc. The first key K may be any key in the three keys, or a key derived according to one or multiple keys in the three keys. For example, the first key K may be set as K=Knas.int XOR Knas.enc.

When the mobile communication network is the LTE network, the corresponding network element equipment may also be an eNB, the shared key between the UE and the eNB is Kenb, Krrc.int, Krrc.enc, Kup.enc, Kup.int, and the first key K may be one key in the Kenb, Krrc.int, Krrc.enc, Kup.enc, Kup.int and the like, and may also be a key derived according to one or multiple in these keys. For example, in this embodiment, the first key K may be set as K=Kenb.

When the mobile communication network is the LTE network and when the corresponding network element equipment may also be the eNB, in the above-mentioned embodiment, corresponding to that "the UE sends the identifier of the UE to the network element equipment", the following two methods may be specifically adopted:

method 1: the UE sends the identifier of the UE to the MME in a security mode complete (SMP) message of a non-access stratum (NAS), and the MME forwards the identifier of the UE to the eNB through an S1 message;

method 2: the UE sends the identifier of the UE to the eNB in an RRC message.

Optionally, in the optional embodiments of the embodiment as shown in FIG. 1, in 101, the UE sends the identifier of the UE (e.g., MAC address) to the network element equipment and the WLAN node; the identifier of the UE (e.g., MAC address) may expose user privacy, thus security protection needs to be implemented to the transmission of the identifier of the UE (e.g., MAC address) by virtue of some manners. The transmission of the identifier of the UE (e.g., MAC address) may be protected in the following several manners:

First situation: the identifier of the UE (e.g., MAC address) is transmitted in an encrypted message, for example, some radio source control (RRC) messages, or a non-access stratum (NAS) message may be used for implementing encryption protection, thus the identifier of the UE may be transmitted in these encrypted RRC messages or NAS messages, such that the transmission confidentiality of the identifier of the UE may be protected, to prevent an attacker from harming the user privacy by using the identifier of the UE, for example, position tracking and the like.

The RRC messages or NAS messages which can be encrypted may include the following messages: an attach complete message, routing area update (RAU) message complete, a tracking area update complete message, a non-access stratum security mode complete (NASSMC) message or a capability transfer message of the UE, etc.

However, in some networks, the operators may not open the encryption function. Therefore, all RRC/NAS signaling could not be protected. In this case, a UE and a controller/core network node may derive according to the first key K to acquire a fourth key Ka. An XOR operation is carried out on the identifier of the UE by means of the fourth key Ka, so as to ensure the transmission security of the identifier of the UE. The derivation of the fourth key Ka may need the participation of some derivation parameters. These derivation parameters may need to be interacted at the UE and a network side. In this embodiment, one example of deriving the fourth key Ka is: Ka=HMAC-SHA256 (K, "MAC anonymity"). MAC anonymity is a character string and is used for expressing that the purpose of the key derivation in this embodiment is to achieve an MAC address concealing function.

According to the secure establishment method of the wireless local area network of the above-mentioned embodiments, by adopting the above-mentioned technical solution, secure connection may be established between the UE and the WLAN node based on the derivation key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of the embodiments, the secure connection may be established between the UE and the WLAN node, thus improving the communication security between the UE and the WLAN node.

Figure 2:
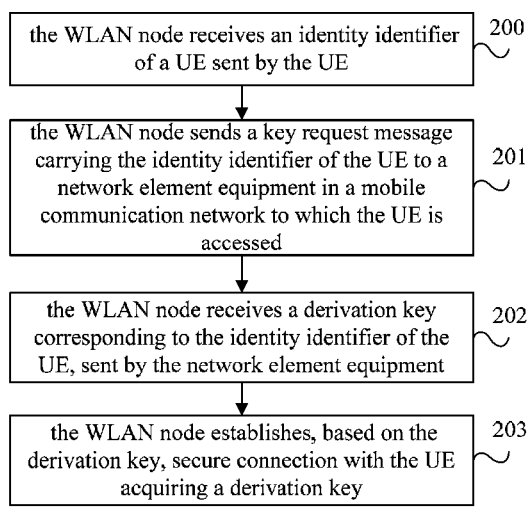
FIG. 2 is a flowchart of a secure establishment method of a WLAN provided by another embodiment of the present invention.

FIG. 2 is a flowchart of a secure establishment method of a WLAN provided by another embodiment of the present invention. As shown in FIG. 2, the executive body of the secure establishment method of the WLAN of this embodiment is a WLAN node. The secure establishment method of the WLAN of this embodiment may specifically include the following steps:

200, the WLAN node receives an identifier of a UE sent by the UE;

201, the WLAN node sends a key request message carrying the identifier of the UE to a network element equipment in a mobile communication network to which the UE is accessed;

202, the WLAN node receives a derivation key corresponding to the identifier of the UE, sent by the network element equipment;

in this embodiment, the derivation key is acquired by deriving according to a first key and a derivation parameter by the network element equipment, wherein the first key is a shared key of the UE and the network element equipment when implementing air interface security, or is derived according to the shared key of the UE and the network element equipment when implementing the air interface security, and the derivation parameter is determined by means of consultation between the UE and the network element equipment.

203, the WLAN node establishes, based on the derivation key, secure connection with the UE acquiring a derivation key.

The derivation key acquired by the UE is the same as the derivation key acquired by the WLAN node. Namely, when the technical solution of this embodiment is achieved, the UE may also acquire the derivation key. For example, the UE may derive according to the first key and the derivation parameter to acquire the derivation key, and reference may be made to recordings in the embodiment as shown in the above-mentioned FIG. 1 for details. In this way, by adopting the technical solution of this embodiment, the UE and the WLAN node may both acquire the derivation key, so that the secure connection may be established based on the derivation key, to ensure the communication security between the UE and the WLAN node.

The only difference between this embodiment and the embodiment as shown in the above-mentioned FIG. 1 lies in that: the technical solution of the present invention is described on the UE side in the embodiment as shown in the above-mentioned FIG. 1, and the technical solution of the present invention is described on the WLAN node side in this embodiment, wherein the rest implementation processes are completely the same, and reference may be made to recordings in the embodiment as shown in the above-mentioned FIG. 1 for details which will not be repeated redundantly herein.

According to the secure establishment method of the wireless local area network of this embodiment, by adopting the above-mentioned technical solution, the secure connection may be established between the UE and the WLAN node based on the derivation key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Optionally, on the basis of the technical solution of the embodiment as shown in the above-mentioned FIG. 2, the following optional technical solutions may also be included to form optional embodiments of the embodiment as shown in FIG. 2.

In the optional embodiments of the embodiment as shown in FIG. 2, step 202 "the WLAN node receives a derivation key corresponding to the identifier of the UE, sent by the network element equipment" in the above-mentioned embodiment, may specifically include: the WLAN node receives a second key corresponding to the identifier of the UE, sent by the network element equipment, and the second key is acquired by the network element equipment according to the identifier of the UE and a corresponding relationship between the identifier of the UE and the second key, stored in the network element equipment; the second key is acquired by deriving according to the first key and the derivation parameter by the network element equipment; in the technical solution, the derivation key is the second key. At this time, the corresponding step 203 "the WLAN node establishes secure connection with the UE based on the derivation key," may specifically include: the WLAN node establishes the secure connection with the UE based on the second key. By adopting the technical solution, the second key is derived from the first key and the derivation parameter determined by consultation with the UE, which may be ensured that different UEs has different second keys and each UE may establish the secure connection with the WLAN node based on the corresponding second key thereof, such that the secure connection between the UE and the WLAN node may be effectively ensured.

By adopting the above-mentioned solution, different UEs has different second keys, so that the secure connection between the UE and the WLAN node may be reinforced; but when being accessed to the WLAN by adopting different WLAN nodes, the same UE establishes the secure connection with the WLAN nodes by adopting the same second key, thus still bringing certain potential safety hazard to accessing the UE to the WLAN. In order to solve the problem, optionally, in the optional embodiments of the embodiment as shown in FIG. 2, the following solutions may also be included:

in the above-mentioned embodiment, step 202 "the WLAN node receives a derivation key corresponding to the identifier of the UE, sent by the network element equipment", may specifically include: the WLAN node receives a third key sent by the network element equipment, and the third key is acquired by deriving according to the second key and the identifier of the WLAN node by the network element equipment; the second key is acquired by the network element equipment according to the identifier of the UE and a corresponding relationship between the identifier of the UE and the second key, stored in the network element equipment; the second key is acquired by deriving according to the first key and the derivation parameter determined by consultation with the UE by the network element equipment. After receiving a key request message carrying the identifier of the UE, sent by the WLAN node, the network element equipment may acquire an IP address of the WLAN node and acquire the identifier of the WLAN node according to the IP address of the WLAN node. In practical application, the network element equipment may also acquire the identifier of the WLAN node by adopting other methods. In addition, the identifier of the WLAN node may be an SSID of the WLAN node, or an MAC address of the WLAN node or other identity information capable of uniquely identifying the WLAN node.

Correspondingly, step 203 in the above-mentioned embodiment "the WLAN node establishes secure connection with the UE based on the derivation key," may specifically include: the WLAN node establishes the secure connection with the UE based on the third key. In the solution, the derivation key is the third key. By adopting the technical solution, it may be ensured that when being accessed to the WLAN from different WLAN nodes, the same UE adopts different third keys. Compared with the above-mentioned manner that each UE may establish the secure connection with the WLAN node based on the corresponding second key thereof, the security of the connection established between the UE and the WLAN node may be further reinforced.

Further optionally, when the derivation key is the third key, step 201 in the above-mentioned embodiment "the WLAN node sends a key request message carrying the identifier of the UE to network element equipment in a mobile communication network to which the UE is accessed", may specifically include: the WLAN node sends the key request message carrying the identifier of the UE and the identifier of the WLAN node to the network element equipment. At this time, the network element equipment may directly acquire the identifier of the WLAN node instead of indirectly acquiring the identifier of the WLAN node.

In the optional embodiments of the embodiment as shown in FIG. 2, the mobile communication network in the above-mentioned embodiment may be a GSM network, a UMTS, an LTE system, a CDMA network or a GPRS network; the network element equipment may be a BSC of the GSM network, an RNC of the UMTS, an SGSN of the GPRS network, an MME of the LTE system or an eNB in the LTE system.

Optionally, in the optional embodiments of the embodiment as shown in FIG. 1, the identifier of the UE is an MAC address of the UE, an IMSI of the UE, a TMSI of the UE, a P-TIMSI of the UE, a GUTI of the UE, an S-TMSI of the UE, an RNTI of the UE or an MSISDN of the UE.

It should be noted that, all optional technical solutions capable of being applied to the WLAN node side in the optional embodiments of the embodiment as shown in FIG. 1 may be used in the optional embodiments of the embodiment as shown in FIG. 2, and reference may be made to the optional embodiments of the embodiment as shown in FIG. 1 for details which will not be repeated redundantly herein.

According to the secure establishment method of the wireless local area network of the above-mentioned embodiment, by adopting the above-mentioned technical solution, secure connection may be established between the UE and the WLAN node based on the derivation key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Figure 3:
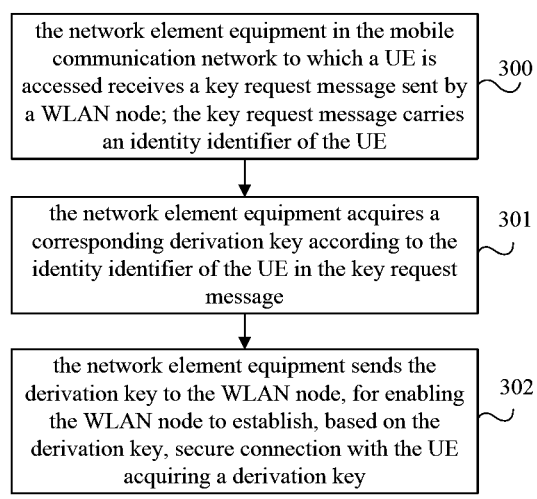
FIG. 3 is a flowchart of a secure establishment method of a WLAN provided by yet another embodiment of the present invention.

FIG. 3 is a flowchart of a secure establishment method of a WLAN provided by yet another embodiment of the present invention. As shown in FIG. 3, the executive body of the secure establishment method of the WLAN of this embodiment is a network element equipment in a mobile communication network. The secure establishment method of the WLAN of this embodiment may specifically include the following steps:

300, the network element equipment in the mobile communication network to which a UE is accessed receives a key request message sent by a WLAN node; the key request message carries an identifier of the UE;

301, the network element equipment acquires a corresponding derivation key according to the identifier of the UE in the key request message;

in this embodiment, the derivation key is acquired by deriving according to a first key and a derivation parameter by the network element equipment; wherein the first key is a shared key of the network element equipment and the UE when implementing air interface security, or is derived according to the shared key of the network element equipment and the UE when implementing the air interface security. The derivation parameter is determined by means of consultation between the network element equipment and the UE.

302, the network element equipment sends the derivation key to the WLAN node, for the WLAN node to establish, based on the derivation key, secure connection with the UE acquiring a derivation key.

The derivation key acquired by the UE is the same as the derivation key sent by the network element equipment and received by the WLAN node. The only difference between this embodiment and the embodiment as shown in the above-mentioned FIG. 1 or FIG. 2 lies in that: the technical solution of the present invention is described on the UE side in the embodiment as shown in the above-mentioned FIG. 1, the technical solution of the present invention is described on the WLAN node side in the embodiment as shown in FIG. 2, and the technical solution of the present invention is described on the network element equipment side in the mobile communication network in this embodiment, wherein the rest implementation processes are completely the same, and reference may be made to recordings in the embodiment as shown in the above-mentioned FIG. 1 or FIG. 2 for details which will not be repeated redundantly herein.

According to the secure establishment method of the wireless local area network of this embodiment, by adopting the above-mentioned technical solution, the secure connection may be established between the UE and the WLAN node based on the derivation key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Optionally, on the basis of the technical solution of the embodiment as shown in the above-mentioned FIG. 3, the following optional technical solutions may also be included to form optional embodiments of the embodiment as shown in FIG. 3.

In the optional embodiments of the embodiment as shown in FIG. 3, prior to step 301, the method further includes the following steps: 303, the network element equipment acquires a first key.

Optionally, in the optional embodiments of the embodiment as shown in FIG. 3, after step 303 "the network element equipment acquires a first key", and prior to step 301 "the network element equipment acquires a corresponding derivation key according to the identifier of the UE in the key request message", the method may further include the following steps:

(1) the network element equipment derives according to the first key and the derivation parameter to acquire a second key;

(2) a corresponding relationship between the second key and the identifier of the UE is established.

At this time, the corresponding step 301 "the network element equipment acquires a corresponding derivation key according to the identifier of the UE in the key request message", may specifically include: the network element equipment acquires the second key according to the corresponding relationship between the second key and the identifier of the UE and the identifier of the UE in the key request message. Namely, in this embodiment, the derivation key is the second key.

At this time, the corresponding step 302 "the network element equipment sends the derivation key to the WLAN node, for the WLAN node to establish secure connection with the UE based on the derivation key", may specifically include: the network element equipment sends the second key to the WLAN node, for the WLAN node to establish secure connection with the UE based on the second key.

Or further optionally, when after step 303 "the network element equipment acquires a first key" and prior to step 301 "the network element equipment acquires a corresponding derivation key according to the identifier of the UE in the key request message", the method further includes the above-mentioned steps (1) and (2), at this time, the corresponding step 300 "the network element equipment receives a key request message carrying the identifier of the UE, sent by a WLAN node", may specifically include: the network element equipment receives the key request message carrying the identifier of the UE and the identifier of the WLAN node, sent by the WLAN node. Or optionally, the key request message received by the network element equipment and sent by the WLAN node may carry no identifier of the WLAN node, and the network element equipment acquires the identifier of the WLAN node by itself. For example, after receiving the key request message carrying the identifier of the UE, sent by the WLAN node, the network element equipment may acquire the IP address of the WLAN node and acquire the identifier of the WLAN node according to the IP address of the WLAN node. In practical application, the network element equipment may also acquire the identifier of the WLAN node by adopting other methods. In addition, the identifier of the WLAN node may be an SSID of the WLAN node, or an MAC address of the WLAN node or other identity information capable of uniquely identifying the WLAN node.

At this time, the corresponding step 301 "the network element equipment acquires a corresponding derivation key according to the identifier of the UE in the key request message", may specifically include the following steps:

(a) the network element equipment acquires the second key according to the corresponding relationship between the second key and the identifier of the UE and the identifier of the UE in the key request message;

(b) the network element equipment derives according to the second key and the identifier of the WLAN node in the key request message to acquire a third key. Namely, in the technical solution, the derivation key is the third key.

At this time, the corresponding step 302 "the network element equipment sends the derivation key to the WLAN node, for the WLAN node to establish secure connection with the UE based on the derivation key", may specifically include: the network element equipment sends the third key to the WLAN node, for the WLAN node to establish secure connection with the UE based on the third key.

Optionally, in the optional embodiments of the embodiment as shown in FIG. 3, the mobile communication network in the above-mentioned embodiment may be a GSM network, a UMTS, an LTE system, a CDMA network or a GPRS network; the network element equipment may be a BSC of the GSM network, an RNC of the UMTS, an SGSN of the GPRS network, an MME of the LTE system or an eNB in the LTE system.

Optionally, in the optional embodiments of the embodiment as shown in FIG. 3, the identifier of the UE is an MAC address of the UE, an IMSI of the UE, a TMSI of the UE, a P-TIMSI of the UE, a GUTI of the UE, an S-TMSI of the UE, an RNTI of the UE or an MSISDN of the UE.

Further optionally, when the identifier of the UE is the MAC address of a WLAN interface of the UE, prior to step 300 "the network element equipment receives a key request message carrying an identifier of the UE, sent by a WLAN node", the method may further include: the network element equipment receives the identifier of the UE sent by the UE. For example, the network element equipment may specifically receive the identifier of the UE sent by the UE in an encryption manner. For example, the encrypted message may be an encrypted attach complete message, an encrypted RAU message complete message, an encrypted TAU complete message, an encrypted NAS SMC message or an encrypted capability transfer message of the UE, etc. In this way, by adopting the above-mentioned solution, the identifier of the UE may be effectively protected, so that the security of the derivation key may be effectively ensured to further reinforce the secure connection between the UE and the WLAN node effectively.

It should be noted that, all optional technical solutions capable of being applied to the network element equipment side in the optional embodiments of the embodiment as shown in FIG. 1 may be used in the optional embodiments of the embodiment as shown in FIG. 3, and reference may be made to the optional embodiments of the embodiment as shown in FIG. 1 for details which will not be repeated redundantly herein.

According to the secure establishment method of the wireless local area network of the above-mentioned embodiment, by adopting the above-mentioned technical solution, secure connection may be established between the UE and the WLAN node based on the derivation key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Figure 4:
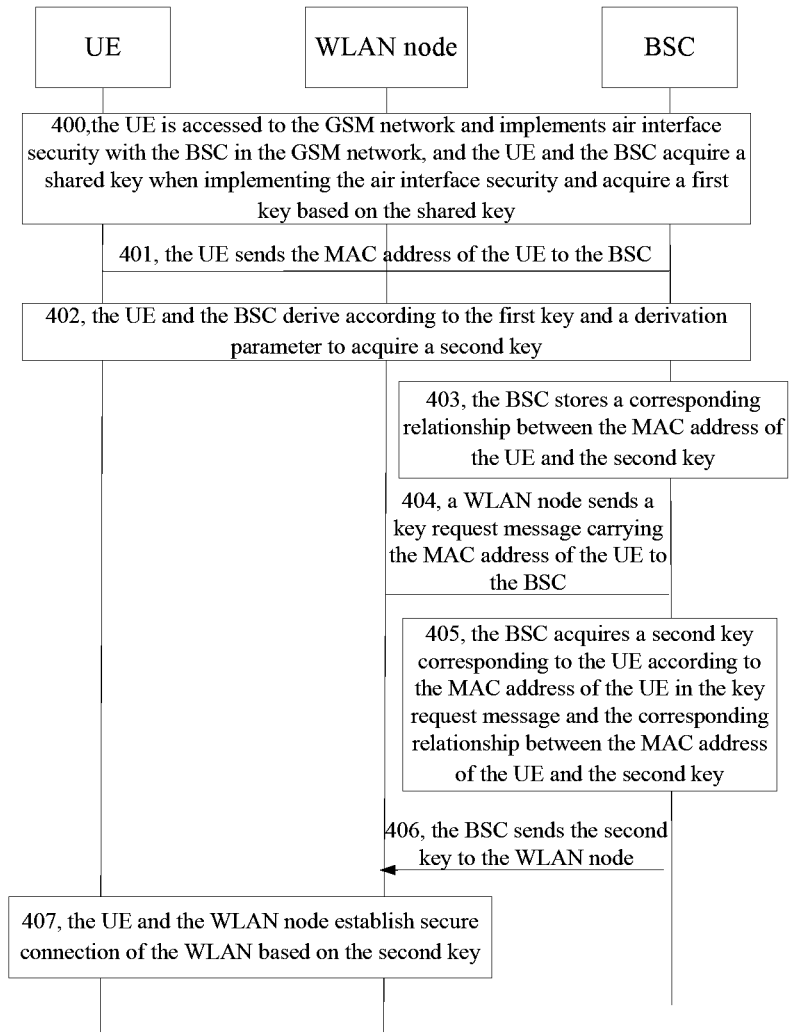
FIG. 4 is a signaling diagram of a secure establishment method of a WLAN provided by an embodiment of the present invention.

FIG. 4 is a signaling diagram of a secure establishment method of a WLAN provided by an embodiment of the present invention. On the basis of the above-mentioned embodiments, by taking it as an example that the mobile communication network is a GSM network, the network element equipment is a BSC and the identifier of the UE is an MAC address of the UE in this embodiment, the technical solutions of the embodiments of the present invention are described in detail.

As shown in FIG. 4, the secure establishment method of the WLAN of this embodiment may specifically include the following steps:

400, the UE is accessed to the GSM network and implements air interface security with the BSC in the GSM network, and the UE and the BSC acquire a shared key when implementing the air interface security and acquire a first key based on the shared key;

For example, reference may be made to recordings in embodiments as shown in the above-mentioned FIG. 1 to FIG. 3, and the first key is the shared key or is derived according to the shared key.

401, the UE sends the MAC address of the UE to the BSC;

for example, the UE may send the MAC address of the UE to the BSC by carrying the MAC address of the UE in an RRC message. In the embodiment of the present invention, when the identifier of the UE is anything excluding the MAC address, the BSC may acquire the identifier of the UE from itself, and the step 401 may be omitted.

402, the UE and the BSC derive according to the first key and a derivation parameter to acquire a second key;

in this embodiment, the derivation parameter may be determined by means of consultation between the UE and the BSC. Step 401 and step 402 may be implemented in any order of priority.

403, the BSC stores a corresponding relationship between the MAC address of the UE and the second key;

404, a WLAN node sends a key request message carrying the MAC address of the UE to the BSC;

for example, when sending a WiFi message to the WLAN node while the UE is accessed to the WLAN node, the MAC address of the UE has been notified to the WLAN node, wherein reference may be made to related prior art for details which will not be repeated redundantly herein.

405, the BSC acquires a second key corresponding to the UE according to the MAC address of the UE in the key request message and the corresponding relationship between the MAC address of the UE and the second key;

406, the BSC sends the second key to the WLAN node;

407, the UE and the WLAN node establish secure connection of the WLAN based on the second key.

In this embodiment, the key request message sent by the WLAN node to the BSC may further carry an identifier of the WLAN node, at this time after step 405, the UE and the BSC may derive based on the second key and the identifier of the WLAN node to acquire a third key, at this time, the corresponding BSC sends the third key to the WLAN node, and at this time, the corresponding UE and the WLAN node establish the secure connection based on the third key.

According to the secure establishment method of the wireless local area network of this embodiment, by adopting the above-mentioned technical solution, the secure connection may be established between the UE and the WLAN node based on the second key or the third key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, which improving the communication security between the UE and the WLAN node.

Figure 5:
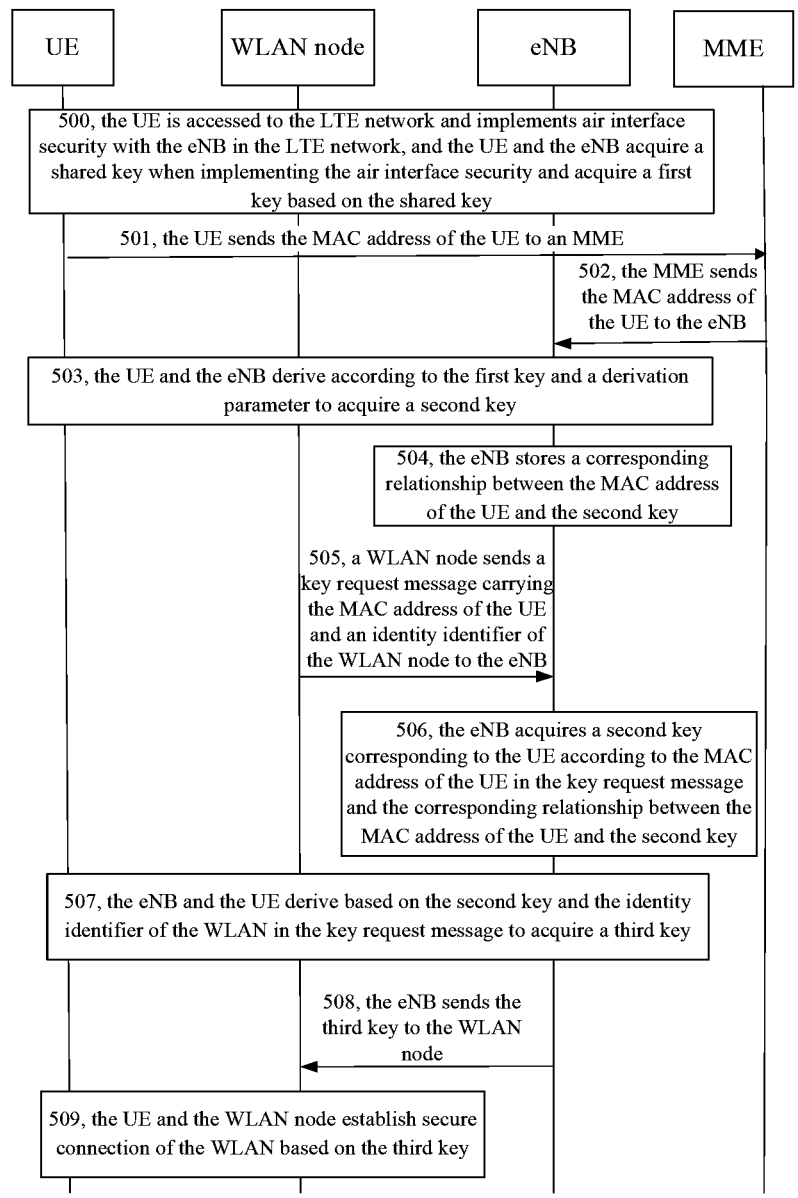
FIG. 5 is a signaling diagram of a secure establishment method of a WLAN provided by another embodiment of the present invention.

FIG. 5 is a signaling diagram of a secure establishment method of a WLAN provided by another embodiment of the present invention. On the basis of the above-mentioned embodiment, by taking it as an example that the mobile communication network is an LTE network, the network element equipment is an eNB and the identifier of the UE is an MAC address of the UE in this establishment, the technical solutions of the embodiments of the present invention are described in detail.

As shown in FIG. 5, the secure establishment method of the WLAN of this embodiment may specifically include the following steps:

500, the UE is accessed to the LTE network and implements air interface security with the eNB in the LTE network, and the UE and the eNB acquire a shared key when implementing the air interface security and acquire a first key based on the shared key;

for example, reference may be made to recordings in embodiments as shown in the above-mentioned FIG. 1 to FIG. 3, and the first key is the shared key or is derived according to the shared key.

501, the UE sends the MAC address of the UE to an MME;

for example, the UE sends the MAC address of the UE to the MME through an NAS SMC.

502, the MME sends the MAC address of the UE to the eNB;

for example, the MME forwards the MAC address of the UE to the eNB by means of an S1 message.

Optionally, the UE may also send the MAC address of the UE to the eNB in an RRC message.

In the embodiment of the present invention, when the identifier of the UE is anything excluding the MAC address, a BSC may acquire the identifier of the UE from itself, and the step 401 may be omitted.

503, the UE and the eNB derive according to the first key and a derivation parameter to acquire a second key;

in this embodiment, the derivation parameter may be determined by means of consultation between the UE and the eNB. Step 503, Step 501 and step 502 may be implemented in any order of priority.

504, the eNB stores a corresponding relationship between the MAC address of the UE and the second key;

505, a WLAN node sends a key request message carrying the MAC address of the UE and an identifier of the WLAN node to the eNB;

for example, when sending a WiFi message to the WLAN node while the UE is accessed to the WLAN node, the MAC address of the UE has been notified to the WLAN node, reference may be made to related prior art for details which will not be repeated redundantly herein.

506, the eNB acquires a second key corresponding to the UE according to the MAC address of the UE in the key request message and the corresponding relationship between the MAC address of the UE and the second key;

507, the eNB and the UE derive based on the second key and the identifier of the WLAN in the key request message to acquire a third key;

508, the eNB sends the third key to the WLAN node;

509, the UE and the WLAN node establish secure connection of the WLAN based on the third key.

According to the secure establishment method of the wireless local area network of this embodiment, by adopting the above-mentioned technical solution, the secure connection may be established between the UE and the WLAN node based on the third key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

The above-mentioned FIG. 4 and FIG. 5 are merely two optional embodiments of the embodiments of the present invention. According to the embodiments as shown in the above-mentioned FIG. 1 to FIG. 3 and the corresponding optional embodiments, the signaling diagrams of other embodiments of the present invention may also be deduced, and will not be repeated redundantly herein by exemplifying them one by one.

Figure 6:
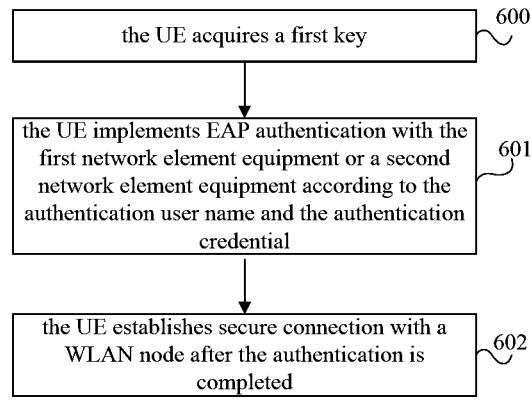
FIG. 6 is a flowchart of a secure establishment method of a WLAN provided by yet another embodiment of the present invention.

FIG. 6 is a flowchart of a secure establishment method of a WLAN provided by yet another embodiment of the present invention. As shown in FIG. 6, the executive body of the secure establishment method of the WLAN of this embodiment is a UE. The secure establishment method of the WLAN of this embodiment may specifically include the following steps:

600, the UE acquires a first key;

in this embodiment, the first key is a shared key of the UE and a first network element equipment in a mobile communication network to which the UE is accessed when implementing air interface security, or the first key is derived according to the shared key of the UE and the first network element equipment in the accessed mobile communication network when implementing the air interface security; the UE derives according to an identifier of the UE and the first key to generate an authentication user name and an authentication credential.

601, the UE implements extensible authentication protocol (EAP) authentication with the first network element equipment or a second network element equipment according to the authentication user name and the authentication credential;

602, the UE establishes secure connection with a WLAN node after the authentication is completed.

In this embodiment, reference may be made to EAP authentication in the prior art for details of the EAP authentication process, which will not be repeated redundantly herein.

In this embodiment, the second network element equipment acquires the authentication user name and the authentication credential from the first network element equipment;

or the second network element equipment acquires an identifier of the UE and the first key from the first network element equipment, and derives according to the identifier of the UE and the first key to generate the authentication user name and the authentication credential. In this embodiment, the first network element equipment and the second network element equipment are merely names of two network element equipment, and in practical application, the names of the two network element equipment may be interchanged.

According to the secure establishment method of the wireless local area network of this embodiment, by adopting the above-mentioned technical solution, the UE derives according to the identifier of the UE and the first key to generate the authentication user name and the authentication credential; the UE implements the EAP authentication with the network element equipment in the mobile communication network to which the UE is accessed according to the authentication user name and the authentication credential, and the secure connection is established between the UE and the WLAN node after the authentication is completed; wherein the first key is the shared key of the user equipment and the network element equipment in the accessed mobile communication network when implementing the air interface security or is derived according to the shared key. By adopting the above-mentioned technical solution of this embodiment, the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Optionally, the mobile communication network in the above-mentioned embodiment may be a GSM network, a UMTS, an LTE system, a CDMA network or a GPRS network; the network element equipment may be a BSC of the GSM network, an RNC of the UMTS, an SGSN of the GPRS network, an MME of the LTE network or an eNB in the LTE system.

Optionally, the identifier of the UE in the above-mentioned embodiment is an MAC address of the UE, an IMSI of the UE, a TMSI of the UE, a P-TIMSI of the UE, a GUTI of the UE, an S-TMSI of the UE, an RNTI of the UE or an MSISDN of the UE.

Figure 7:
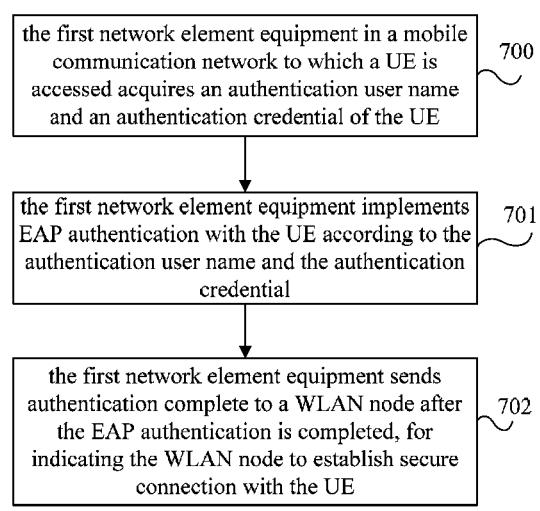
FIG. 7 is a flowchart of a secure establishment method of a WLAN provided by still another embodiment of the present invention.

FIG. 7 is a flowchart of a secure establishment method of a WLAN provided by still another embodiment of the present invention. As shown in FIG. 7, the executive body of the secure establishment method of the WLAN of this embodiment is a first network element equipment. The secure establishment method of the WLAN of this embodiment may specifically include the following steps:

700, the first network element equipment in a mobile communication network to which a UE is accessed acquires an authentication user name and an authentication credential of the UE;

In this embodiment, the authentication user name and the authentication credential are generated by deriving according to an identifier of the UE and a first key; the first key is a shared key of the UE and the first network element equipment or second network element equipment in the accessed mobile communication network when implementing air interface security, or the first key is derived according to the shared key of the UE and the first network element equipment or the second network element equipment in the accessed mobile communication network when implementing the air interface security.

701, the first network element equipment implements EAP authentication with the UE according to the authentication user name and the authentication credential;

702, the first network element equipment sends authentication complete to a WLAN node after the EAP authentication is completed, for indicating the WLAN node to establish secure connection with the UE.

The only difference between this embodiment and the embodiment as shown in the above-mentioned FIG. 6 lies in that: the technical solution of the present invention is described on the UE side in the embodiment as shown in the above-mentioned FIG. 6, while the technical solution of the present invention is described on the first network element equipment side in the mobile communication network in this embodiment, wherein the rest implementation processes are completely the same and reference may be made to recordings in the embodiment as shown in the above-mentioned FIG. 6 for details which will not be repeated redundantly herein.

According to the secure establishment method of the wireless local area network of this embodiment, by adopting the above-mentioned technical solution, the first network element equipment acquires the authentication user name and the authentication credential of the UE, implements the EAP authentication with the UE according to the authentication user name and the authentication credential, and sends authentication complete to the WLAN node after the authentication is completed, for indicating the WLAN node to establish the secure connection with the UE; wherein the authentication user name and the authentication credential are generated by deriving according to the identifier of the UE and the first key; the first key is the shared key of the UE and the first network element equipment or the second network element equipment in the accessed mobile communication network when implementing the air interface security or is derived according to the shared key. By adopting the above-mentioned technical solution of this embodiment, the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of the embodiment of the present invention, the secure connection may be established between the UE and the WLAN node, thus improving the communication security between the UE and the WLAN node.

Optionally, on the basis of the technical solution of the embodiment as shown in the above-mentioned FIG. 7, the following optional technical solutions may also be included to form optional embodiments of the embodiment as shown in FIG. 7.

In the optional embodiments of the embodiment as shown in FIG. 7, step 700 "the first network element equipment in a mobile communication network to which a UE is accessed acquires an authentication user name and an authentication credential of the UE", may specifically include the following steps:

(1) the first network element equipment receives the identifier of the UE and the first key, sent by the second network element equipment, wherein the first key is the shared key of the UE and the second network element equipment when implementing the air interface security or is derived according to the shared key;

(2) the first network element equipment derives according to the identifier of the UE and the first key to generate the authentication user name and the authentication credential.

Or optionally, the step 700 "the first network element equipment in a mobile communication network to which UE is accessed acquires an authentication user name and an authentication credential of the UE", may specifically include: the first network element equipment receives the authentication user name and the authentication credential sent by the second network element equipment, wherein the authentication user name and the authentication credential are generated by the second network element equipment by deriving according to the identifier of the UE and the first key, and the first key is the shared key of the UE and the second network element equipment when implementing the air interface security or is derived according to the shared key.

Or further optionally, the step 700 "the first network element equipment in a mobile communication network to which a UE is accessed acquires an authentication user name and an authentication credential of the UE", may specifically include the following steps:

(a) the first network element equipment acquires the first key; the first key is the shared key of the first network element equipment and the UE when implementing the air interface security or is derived according to the shared key;

(b) the first network element equipment derives according to the identifier of the UE and the first key to generate the authentication user name and the authentication credential.

Optionally, the mobile communication network in the above-mentioned embodiment may be a GSM network, a UMTS, an LTE system, a CDMA network or a GPRS network; the network element equipment may be a BSC of the GSM network, an RNC of the UMTS, an SGSN of the GPRS network, an MME of the LTE network or an eNB in the LTE system.

Optionally, the identifier of the UE in the above-mentioned embodiment is an MAC address of the UE, an IMSI of the UE, a TMSI of the UE, a P-TIMSI of the UE, a GUTI of the UE, an S-TMSI of the UE, an RNTI of the UE or an MSISDN of the UE.

It should be noted that, all optional technical solutions capable of being applied to the network element equipment side in the optional embodiments of the embodiment as shown in FIG. 6 may be used in the optional embodiments of the embodiment as shown in FIG. 7, and reference may be made to the optional embodiments of the embodiment as shown in FIG. 6 for details which will not be repeated redundantly herein.

By adopting the technical solution of the above-mentioned embodiment, the first network element equipment acquires the authentication user name and the authentication credential of the UE, implements the EAP authentication with the UE according to the authentication user name and the authentication credential, and enables the UE to establish the secure connection with the WLAN node after the authentication is completed; wherein the authentication user name and the authentication credential are generated by deriving according to the identifier of the UE and the first key; the first key is the shared key of the UE and the first network element equipment or the second network element equipment in the accessed mobile communication network when implementing the air interface security or is derived according to the shared key. By adopting the above-mentioned technical solution of this embodiment, the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of the embodiment of the present invention, the secure connection may be established between the UE and the WLAN node, thus improving the communication security between the UE and the WLAN node.

Those of ordinary skill in the art may understand that all or a part of the steps of the above-mentioned method embodiments may be implemented by a program instructing relevant hardware. The foregoing program may be stored in a computer readable storage medium. When the program is executed, the steps of the above-mentioned method embodiments are implemented; and the foregoing program includes a variety of media capable of storing program codes, such as an ROM, an RAM, a magnetic disk, an optical disk or the like.

Figure 8:
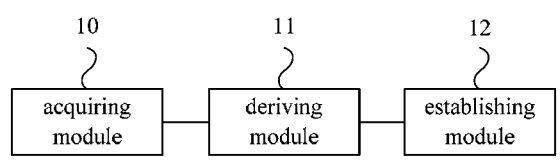
FIG. 8 is a schematic diagram of a structure of a UE provided by an embodiment of the present invention.

FIG. 8 is a schematic diagram of a structure of a UE provided by an embodiment of the present invention. As shown in FIG. 8, the UE of this embodiment may specifically include an acquiring module 10, a deriving module 11 and an establishing module 12.

The acquiring module 10 is configured to acquire a first key; the first key is a shared key of the UE of this embodiment and network element equipment in a mobile communication network to which the UE is accessed when implementing air interface security, or the first key is derived according to the shared key of the UE and the network element equipment in the accessed mobile communication network when implementing the air interface security. The deriving module 11 is connected with the acquiring module 10, and the deriving module 11 is configured to derive according to the first key acquired by the acquiring module 10 and a derivation parameter to acquire a derivation key, wherein the derivation parameter is determined by means of consultation between the UE and the network element equipment. The establishing module 12 is connected with the deriving module 11, and the establishing module is configured to establish secure connection with a WLAN node acquiring a derivation key according to the derivation key derived by the deriving module 11, wherein the derivation key acquired by the WLAN node is the same as the derivation key acquired by the UE. For example, the WLAN node may request to acquire the derivation key from the network element equipment, and the network element equipment derives according to the first key and the derivation parameter to acquire the derivation key.

In this embodiment, the UE and the network element equipment may both acquire the derivation parameter, and it may be considered that the derivation parameter is determined by means of the consultation of the both. There may be specifically one or multiple derivation parameters. For example, the derivation parameter may be appointed by the UE and the network element equipment in advance, or is consulted online when deriving the derivation key. For example, the UE may provide some parameters to serve as the derivation parameters, and then notifies the network element equipment of the derivation parameters. Or, the network element equipment provides some parameters to serve as the derivation parameters, and then notifies the network element equipment of the derivation parameters. Or, the UE provides some parameters or the network element equipment provides some parameters, then the UE and the network element equipment exchange the respectively provided parameters, and at this time, the corresponding derivation parameters are composed of the parameters provided by the UE and the parameters provided by the network element equipment.

The UE of this embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

According to the UE of this embodiment, by adopting the above-mentioned modules, the UE may establish the secure connection with the WLAN node based on the derivation key, and may overcome the defects in the prior art that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Figure 9:
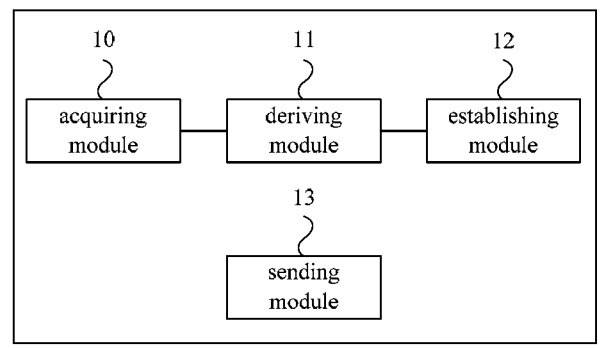
FIG. 9 is a schematic diagram of a structure of a UE provided by another embodiment of the present invention.

FIG. 9 is a schematic diagram of a structure of a UE provided by another embodiment of the present invention. As shown in FIG. 9, on the basis of the embodiment as shown in the above-mentioned FIG. 8, the UE of this embodiment may further include the following technical solutions.

The UE of this embodiment includes a sending module 13. The sending module 13 is configured to send an identifier of the UE to a WLAN node, for the WLAN node to request network element equipment to acquire a derivation key corresponding to the UE according to the identifier of the UE.

Optionally, in the UE of this embodiment, the deriving module 11 is specifically configured to derive according to the first key acquired by the acquiring module 10 and a derivation parameter to acquire a second key; the establishing module 12 is specifically configured to establish secure connection with the WLAN node according to the second key derived by the deriving module 11.

Optionally, in the UE of this embodiment, the deriving module 11 is specifically configured to derive according to the first key and the derivation parameter to acquire the second key, and derive according to the second key and an identifier of the WLAN node to acquire a third key; when beginning to be accessed to the WLAN node, the UE may acquire the identifier of the WLAN node. In this embodiment, on a network element equipment side, the network element equipment may also acquire the identifier of the WLAN node and derive according to the second key and the identifier of the WLAN node to acquire the third key. The establishing module 23 is specifically configured to establish secure connection with the WLAN node according to the third key derived by the deriving module 11.

Optionally, in the UE of this embodiment, the identifier of the UE is an MAC address of the UE, an IMSI of the UE, a TMSI of the UE, a P-TIMSI of the UE, a GUTI of the UE, an S-TMSI of the UE, an RNTI of the UE or an MSISDN of the UE.

Further optionally, in the UE of this embodiment, the sending module 13 is further configured to, when the identifier of the UE is the MAC address of a WLAN interface of the UE, send the identifier of the UE to the network element equipment. For example, the sending module 13 is specifically configured to, when the identifier of the UE is the media access control address of the WLAN interface of the UE, send the identifier of the UE to the network element equipment in an encryption manner. For example, the UE of this embodiment may further include a carrying module, configured to carry the identifier of the UE in such messages as an attach complete message, an RAU message complete message, a TAU complete message, an NAS SMC message or a capability transfer message of the UE, etc., and the sending module 13 is configured to send an encrypted message carrying the identifier of the UE to the network element equipment, such as an attach complete message, an RAU message complete message, a TAU complete message, an NAS SMC message or a capability transfer message of the UE, etc.

Optionally, in the UE of this embodiment, the mobile communication network may be a GSM network, a UMTS, an LTE system, a CDMA network or a GPRS network; the network element equipment may be a BSC of the GSM network, an RNC of the UMTS, an SGSN of the GPRS network, an MME of the LTE system or an eNB in the LTE system.

The UE of the above-mentioned embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

According to the UE of the above-mentioned embodiment, by adopting the above-mentioned modules, the UE may establish the secure connection with the WLAN node based on the derivation key, and may overcome the defects in the prior art that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Figure 10:
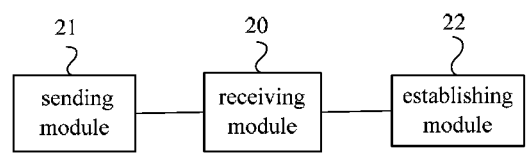
FIG. 10 is a schematic diagram of a structure of a WLAN node equipment provided by an embodiment of the present invention.

FIG. 10 is a schematic diagram of a structure of a WLAN node equipment provided by an embodiment of the present invention. As shown in FIG. 10, the WLAN node equipment of this embodiment may specifically include: a receiving module 20, a sending module 21 and an establishing module 22.

The receiving module 20 is configured to receive an identifier of a UE sent by the UE; the sending module 21 is connected with the receiving module 20, and the sending module 21 is configured to send a key request message carrying the identifier of the UE, received by the receiving module 20, to network element equipment in a mobile communication network to which the UE is accessed; the receiving module 20 is further configured to receive a derivation key corresponding to the identifier of the UE, sent by the network element equipment; the derivation key is acquired by deriving according to a first key and a derivation parameter by the network element equipment, wherein the first key is a shared key of the UE and the network element equipment when implementing air interface security, or the first key is derived according to the shared key of the UE and the network element equipment when implementing the air interface security; the derivation parameter is determined by means of consultation between the UE and the network element equipment, and for example, reference may be made to recordings in the above-mentioned related embodiments for the determination of the derivation parameter. The establishing module 22 is connected with the receiving module 20, and the establishing module 22 is configured to establish secure connection with the UE acquiring a derivation key based on the derivation key received by the receiving module 20, wherein the derivation key acquired by the UE is the same as the derivation key acquired by the WLAN node. For example, the UE may derive according to the first key and the derivation parameter to acquire the derivation key.

The WLAN node equipment of this embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

By adopting the above-mentioned modules, the WLAN node equipment of this embodiment may establish the secure connection between the UE and the WLAN node based on the derivation key, and may overcome the defects in the prior art that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Optionally, on the basis of the embedment as shown in the above-mentioned FIG. 10, the receiving module 20 is specifically configured to receive a second key corresponding to the identifier of the UE, sent by the network element equipment, wherein the second key is acquired by the network element equipment according to the identifier of the UE and a corresponding relationship between the identifier of the UE and the second key, stored in the network element equipment; the second key is acquired by deriving according to the first key and the derivation parameter by the network element equipment; in this embodiment, the derivation key is the second key. The establishing module 22 is specifically configured to establish the secure connection with the UE based on the second key received by the receiving module 20.

Or optionally, on the basis of the embedment as shown in the above-mentioned FIG. 8, the sending module 21 is specifically configured to send the key request message carrying the identifier of the UE received by the receiving module 20 and an identifier of the WLAN node to the network element equipment; the receiving module 20 is specifically configured to receive a third key sent by the network element equipment, wherein the third key is acquired by deriving according to the second key and the identifier of the WLAN node by the network element equipment; the second key is acquired by the network element equipment according to the identifier of the UE and the corresponding relationship between the identifier of the UE and the second key, stored in the network element equipment; the second key is acquired by deriving according to the first key and the derivation parameter by the network element equipment, and in this embodiment, the derivation key is the third key. The establishing module 22 is specifically configured to establish the secure connection with the UE based on the third key received by the receiving module 20.

Optionally, on the basis of the embedment as shown in the above-mentioned FIG. 10, the identifier of the UE is an MAC address of the UE, an IMSI of the UE, a TMSI of the UE, a P-TIMSI of the UE, a GUTI of the UE, an S-TMSI of the UE, an RNTI of the UE or an MSISDN of the UE.

Optionally, on the basis of the embedment as shown in the above-mentioned FIG. 10, the mobile communication network may be a GSM network, a UMTS, an LTE system, a CDMA network or a GPRS network; the network element equipment may be a BSC of the GSM network, an RNC of the UMTS, an SGSN of the GPRS network, an MME of the LTE system or an eNB in the LTE system.

The WLAN node equipment of the above-mentioned embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

By adopting the above-mentioned modules, the WLAN node equipment of the above-mentioned embodiment may establish the secure connection between the UE and the WLAN node based on the derivation key, and may overcome the defects in the prior art that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Figure 11:
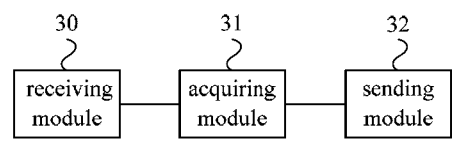
FIG. 11 is a schematic diagram of a structure of a network element equipment provided by an embodiment of the present invention.

FIG. 11 is a schematic diagram of a structure of a network element equipment provided by an embodiment of the present invention. The network element equipment of this embodiment is located in a mobile communication network to which UE is accessed. As shown in FIG. 11, the network element equipment of this embodiment may specifically include: a receiving module 30, an acquiring module 31 and a sending module 32.

The receiving module 30 is configured to receive a key request message sent by a WLAN node, wherein the key request message carries an identifier of a UE; the acquiring module 31 is connected with the receiving module 30, and the acquiring module 31 is configured to acquire a corresponding derivation key according to the identifier of the UE in the key request message received by the receiving module 30; the derivation key is acquired by deriving according to a first key and a derivation parameter by the network element equipment; the first key is a shared key of the network element equipment and the UE when implementing air interface security, or the first key is derived according to the shared key of the network element equipment and the UE when implementing the air interface security; the derivation parameter is determined by means of consultation between the network element equipment and the UE; the sending module 32 is connected with the acquiring module 31, and the sending module 32 is configured to send the derivation key acquired by the acquiring module 31 to the WLAN node, for the WLAN node to establish, based on the derivation key, secure connection with the UE acquiring a derivation key. The derivation key acquired by the UE is the same as the derivation key received by the WLAN node and sent by the network element equipment.

The network element equipment of this embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

By adopting the above-mentioned modules, the network element equipment of this embodiment may establish the secure connection between the UE and the WLAN node based on the derivation key, and may overcome the defects in the prior art that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Figure 12:
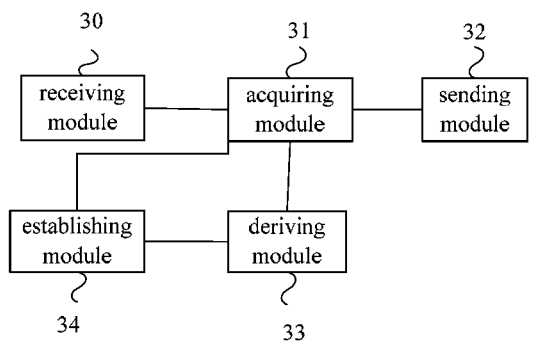
FIG. 12 is a schematic diagram of a structure of a network element equipment provided by another embodiment of the present invention.

FIG. 12 is a schematic diagram of a structure of a network element equipment provided by another embodiment of the present invention. As shown in FIG. 12, on the basis of the embodiment as shown in the above-mentioned FIG. 10, the network element equipment of this embodiment may further include the following technical solutions.

In the network element equipment of this embodiment, the acquiring module 31 is further configured to acquire a first key before acquiring a corresponding derivation key according to an identifier of UE in a key request message.

The network element equipment of this embodiment further includes a deriving module 33 and an establishing module 34. The deriving module 33 is connected with the acquiring module 31, and is configured to derive according to the first key acquired by the acquiring module 31 and a derivation parameter to acquire a second key, after the acquiring module 31 acquires the first key and before acquiring the corresponding derivation key according to the identifier of the UE in the key request message; the establishing module 34 is connected with the deriving module 33, and the establishing module 34 is configured to establish a corresponding relationship between the second key derived by the deriving module 33 and the identifier of the UE. At this time, the corresponding acquiring module 31 is further connected with the establishing module 34, and is specifically configured to acquire the second key according to the corresponding relationship between the second key and the identifier of the UE established by the establishing module 34 and the identifier of the UE in the key request message; namely, in the technical solution, the derivation key is the second key. At this time, the corresponding sending module 32 is specifically configured to send the second key acquired by the acquiring module 31 to a WLAN node, for the WLAN node to establish secure connection with the UE based on the second key.

Or optionally, in the network element equipment of this embodiment, the deriving module 33 is also configured to derive according to the first key acquired by the acquiring module 31 and the derivation parameter to acquire the second key, after the acquiring module 31 acquires the first key and before acquiring the corresponding derivation key according to the identifier of the UE in the key request message; when the establishing module 34 is also configured to establish the corresponding relationship between the second key acquired by the acquiring module 31 and the identifier of the UE, the receiving module 30 is specifically configured to receive the key request message carrying the identifier of the UE and an identifier of the WLAN node sent by the WLAN node; the acquiring module 31 is specifically configured to acquire the second key according to the corresponding relationship between the second key and the identifier of the UE established by the establishing module 34 and the identifier of the UE in the key request message received by the receiving module 30, and derive according to the second key and the identifier of the WLAN node in the key request message to acquire a third key; the sending module 32 is specifically configured to send the third key acquired by the acquiring module 31 to the WLAN node, for the WLAN node to establish the secure connection with the UE based on the third key. Namely, in the technical solution, the derivation key is the third key.

Optionally, in the network element equipment of this embodiment, the identifier of the UE is an MAC address of the UE, an IMSI of the UE, a TMSI of the UE, a P-TIMSI of the UE, a GUTI of the UE, an S-TMSI of the UE, an RNTI of the UE or an MSISDN of the UE.

Optionally, in the network element equipment of this embodiment, the receiving module 30 is further configured to receive the identifier of the UE sent by the UE, when the identifier of the UE is the MAC address of a WLAN interface of the UE. For example, the receiving module 30 is further configured to receive the identifier of the UE sent by the UE in an encryption manner, when the identifier of the UE is the MAC address of the WLAN interface of the UE.

Optionally, in the network element equipment of this embodiment, the mobile communication network may be a GSM network, a UMTS, an LTE system, a CDMA network or a GPRS network; the network element equipment may be a BSC of the GSM network, an RNC of the UMTS, an SGSN of the GPRS network, an MME of the LTE system or an eNB in the LTE system.

The network element equipment of this embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

By adopting the above-mentioned modules, the network element equipment of this embodiment may establish the secure connection between the UE and the WLAN node based on the derivation key, and may overcome the defects in the prior art that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Figure 13:
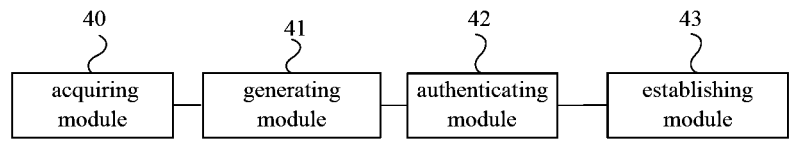
FIG. 13 is a schematic diagram of a structure of a UE provided by yet another embodiment of the present invention.

FIG. 13 is a schematic diagram of a structure of a UE provided by yet another embodiment of the present invention. As shown in FIG. 13, the UE of this embodiment may specifically include an acquiring module 40, a generating module 41, an authenticating module 42 and an establishing module 43.

The acquiring module 40 is configured to acquire a first key; the first key is a shared key of the UE and first network element equipment in a mobile communication network to which the UE is accessed when implementing air interface security, or is derived according to the shared key of the UE and the first network element equipment in the accessed mobile communication network when implementing the air interface security; the generating module 41 is configured to derive according to an identifier of the UE and the first key acquired by the acquiring module 40 to generate an authentication user name and an authentication credential; the authenticating module 42 is connected with the generating module 41, and the authenticating module 42 is configured to implement EAP authentication with the first network element equipment or second network element equipment according to the authentication user name and the authentication credential generated by the generating module 41; the second network element equipment is another network element equipment excluding the first network element equipment in the mobile communication network; the second network element equipment acquires the authentication user name and the authentication credential from the first network element equipment; or the second network element equipment acquires the identifier of the UE and the first key from the first network element equipment, and derives according to the identifier of the UE and the first key to generate the authentication user name and the authentication credential. The establishing module 43 is connected with the authenticating module 42, and the establishing module 43 is configured to establish secure connection with a WLAN node after the authenticating module 42 completes the EAP authentication.

The UE of this embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

According to the UE of this embodiment, by adopting the above-mentioned modules, the UE may derive according to the identifier of the UE and the first key to generate the authentication user name and the authentication credential; the UE implements the EAP authentication with the network element equipment in the mobile communication network to which the UE is accessed according to the authentication user name and the authentication credential, and establishes the secure connection with the WLAN node after the authentication is completed; wherein the first key is the shared key of the user equipment and the network element equipment in the accessed mobile communication network when implementing the air interface security, or is derived according to the shared key. By adopting the above-mentioned technical solution of this embodiment, the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of the embodiment of the present invention, the secure connection may be established between the UE and the WLAN node, thus improving the communication security between the UE and the WLAN node.

Optionally, in the UE of the embodiment as shown in the above-mentioned FIG. 13, the identifier of the UE is an MAC address of the UE, an IMSI of the UE, a TMSI of the UE, a P-TIMSI of the UE, a GUTI of the UE, an S-TMSI of the UE, an RNTI of the UE or an MSISDN of the UE.

Optionally, in the UE of the embodiment as shown in the above-mentioned FIG. 13, the mobile communication network may be a GSM network, a UMTS, an LTE system, a CDMA network or a GPRS network; the network element equipment may be a BSC of the GSM network, an RNC of the UMTS, an SGSN of the GPRS network, an MME of the LTE system or an eNB in the LTE system.

Figure 14:
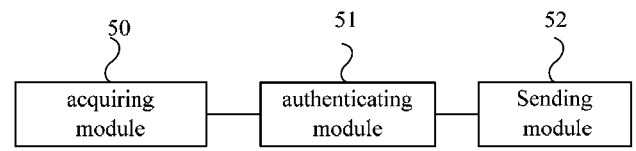
FIG. 14 is a schematic diagram of a structure of a network element equipment provided by yet another embodiment of the present invention.

FIG. 14 is a schematic diagram of a structure of a network element equipment provided by yet another embodiment of the present invention. The network element equipment of this embodiment is located in a mobile communication network to which UE is accessed. As shown in FIG. 14, the network element equipment of this embodiment includes an acquiring module 50, an authenticating module 51 and a sending module 52.

The acquiring module 50 is configured to acquire an authentication user name and an authentication credential of the UE; the authentication user name and the authentication credential are generated by deriving according to an identifier of the UE and a first key; the first key is a shared key of the UE and the network element equipment or second network element equipment when implementing air interface security, or the first key is derived according to the shared key of the UE and the network element equipment or the second network element equipment when implementing the air interface security. The authenticating module 51 is connected with the acquiring module 50, and the authenticating module 51 is configured to implement EAP authentication with the UE according to the authentication user name and the authentication credential; the sending module 52 is connected with the authenticating module 51, and the sending module 52 is configured to send authentication complete to a WLAN node after the authenticating module 51 successfully implements the EAP authentication, for indicating the WLAN node to establish secure connection with the UE.

The network element equipment of this embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

By adopting the above-mentioned modules, the network element equipment of this embodiment may acquire the authentication user name and the authentication credential of the UE, implement the EAP authentication with the UE according to the authentication user name and the authentication credential and establish the secure connection between the UE and the WLAN node after the authentication is completed; wherein the authentication user name and the authentication credential are acquired by deriving according to the identifier of the UE and the first key; the first key is the shared key of the UE and the first network element equipment or the second network element equipment in the accessed mobile communication network when implementing the air interface security, or is derived according to the shared key. By adopting the above-mentioned technical solution of this embodiment, the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of the embodiment of the present invention, the secure connection may be established between the UE and the WLAN node, thus improving the communication security between the UE and the WLAN node.

Optionally, in the network element equipment of the embodiment as shown in the above-mentioned FIG. 14, the acquiring module 50 is specifically configured to receive the identifier of the UE and the first key sent by the second network element equipment, wherein the first key is the shared key of the UE and the second network element equipment when implementing the air interface security or is derived according to the shared key of the UE and the second network element equipment when implementing the air interface security; and derive according to the identifier of the UE and the first key to generate the authentication user name and the authentication credential.

Or optionally, in the network element equipment of the embodiment as shown in the above-mentioned FIG. 14, the acquiring module 50 is specifically configured to receive the authentication user name and the authentication credential sent by the second network element equipment, wherein the authentication user name and the authentication credential are generated by the second network element equipment by deriving according to the identifier of the UE and the first key, and the first key is the shared key of the UE and the second network element equipment when implementing the air interface security or is derived according to the shared key of the UE and the second network element equipment when implementing the air interface security.

Or optionally, in the network element equipment of the embodiment as shown in the above-mentioned FIG. 14, the acquiring module 50 is specifically configured to acquire the first key, wherein the first key is the shared key of the first network element equipment and the UE when implementing the air interface security or is derived according to the shared key of the first network element equipment and the UE when implementing the air interface security; and derive according to the identifier of the UE and the first key to generate the authentication user name and the authentication credential.

Optionally, in the UE of the above-mentioned embodiment, the identifier of the UE is an MAC address of the UE, an IMSI of the UE, a TMSI of the UE, a P-TIMSI of the UE, a GUTI of the UE, an S-TMSI of the UE, an RNTI of the UE or an MSISDN of the UE.

Optionally, in the UE of the above-mentioned embodiment, the mobile communication network may be a GSM network, a UMTS, an LTE system, a CDMA network or a GPRS network; the network element equipment may be a BSC of the GSM network, an RNC of the UMTS, an SGSN of the GPRS network, an MME of the LTE system or an eNB in the LTE system.

The network element equipment of the above-mentioned embodiment implementing secure establishment of the WLAN by adopting the above-mentioned modules is the same as the implementation mechanism of the above-mentioned related method embodiments, and reference may be made to recordings in the above-mentioned related method embodiments for details which will not be repeated redundantly herein.

By adopting the above-mentioned modules, the network element equipment of the above-mentioned embodiment may acquire the authentication user name and the authentication credential of the UE, implement the EAP authentication with the UE according to the authentication user name and the authentication credential and establish the secure connection between the UE and the WLAN node after the authentication is completed; wherein the authentication user name and the authentication credential are generated by deriving according to the identifier of the UE and the first key; the first key is the shared key of the UE and the network element equipment or the second network element equipment when implementing the air interface security or is derived according to the shared key of the UE and the network element equipment or the second network element equipment when implementing the air interface security. By adopting the above-mentioned technical solution of this embodiment, the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of the embodiment of the present invention, the secure connection may be established between the UE and the WLAN node, thus improving the communication security between the UE and the WLAN node.

Figure 15:
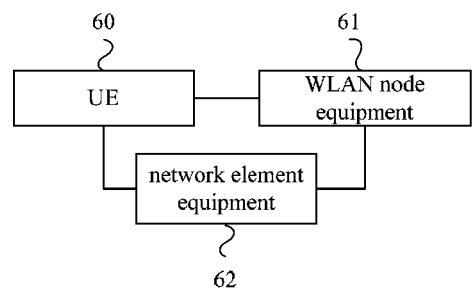
FIG. 15 is a schematic diagram of a structure of a secure establishment system of a WLAN provided by an embodiment of the present invention.

FIG. 15 is a schematic diagram of a structure of a secure establishment system of a WLAN provided by an embodiment of the present invention. As shown in FIG. 15, the secure establishment system of the WLAN of this embodiment includes: a UE 60, a WLAN node equipment 61 and a network element equipment 62. Every two of the UE 60, the WLAN node equipment 61 and the network element equipment 62 are communicated with each other.

The UE 60 is configured to acquire a first key; the first key is a shared key of the UE 60 and the network element equipment 62 in a mobile communication network to which the UE is accessed when implementing air interface security, or is derived according to the shared key of the UE 60 and the network element equipment 62 when implementing the air interface security. The UE 60 derives according to the first key and a derivation parameter to acquire a derivation key. The derivation parameter is determined by means of consultation between the UE 60 and the network element equipment 62. The UE 60 is further configured to send an identifier of the UE to the WLAN node equipment 61.

The WLAN node equipment 61 receives the identifier of the UE sent by the UE 60, and sends a key request message carrying the identifier of the UE to the network element equipment 62.

The network element equipment 62 receives the key request message carrying the identifier of the UE, sent by the WLAN node equipment 61, and acquires a corresponding derivation key according to the identifier of the UE in the key request message; the derivation key is acquired by deriving according to the first key and the derivation parameter by the network element equipment 62; the network element equipment 62 sends the acquired derivation key to the WLAN node equipment 61.

The WLAN node equipment 61 receives the derivation key corresponding to the identifier of the UE, sent by the network element equipment 62. In this way, the UE 60 and the WLAN node equipment 61 both acquire the derivation key, and then the UE 60 and the WLAN node equipment 61 establish secure connection according to the derivation key.

Optionally, the UE 60 in this embodiment may specifically adopt the UE of the embodiment as shown in the above-mentioned FIG. 8 or FIG. 9, the WLAN node equipment 61 in this embodiment may specifically adopt the WLAN node equipment in FIG. 8 and subsequent optional embodiments, and the network element equipment 62 in this embodiment may specifically adopt the network element equipment of the embodiment as shown in the above-mentioned FIG. 11 or FIG. 12. The secure establishment of the WLAN may be implemented by adopting the technical solutions of the embodiments as shown in the above-mentioned FIG. 1 to FIG. 3 and corresponding subsequent optional embodiments, and reference may be made to recordings in the above-mentioned related embodiments for details which will not be repeated redundantly herein.

According to the secure establishment system of the WLAN of this embodiment, by adopting the above-mentioned UE, WLAN node equipment and network element equipment, secure connection may be established between the UE and the WLAN node based on the derivation key, and the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of this embodiment, the secure connection may be established between the UE and the WLAN node, thus improving the communication security between the UE and the WLAN node.

Figure 16:
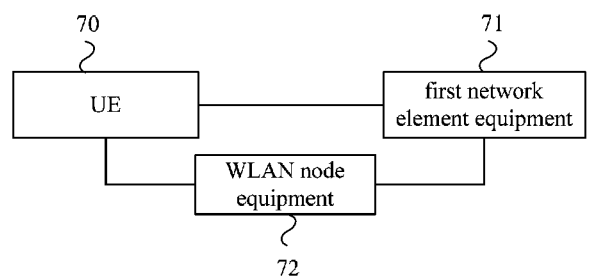
FIG. 16 is a schematic diagram of a structure of a secure establishment system of a WLAN provided by another embodiment of the present invention.

FIG. 16 is a schematic diagram of a structure of a secure establishment system of a WLAN provided by another embodiment of the present invention. As shown in FIG. 16, the secure establishment system of the WLAN of this establishment includes: a UE 70, a first network element equipment 71 and a WLAN node equipment 72. Every two of the UE 70, the first network element equipment 71 and the WLAN node equipment 72 are communicated with each other.

The UE 70 is configured to acquire a first key; the first key is a shared key of the UE 70 and the first network element equipment 71 or second network element equipment (not shown in the figure) in a mobile communication network to which the UE is accessed when implementing air interface security, or is derived according to the shared key of the UE 70 and the first network element equipment 71 or the second network element equipment in the accessed mobile communication network when implementing the air interface security; the UE derives according to an identifier of the UE and the first key to generate an authentication user name and an authentication credential; the first network element equipment 71 also acquires the authentication user name and the authentication credential of the UE.

For example, when the first key is the shared key of the UE 70 and the first network element equipment 71 in the accessed mobile communication network when implementing the air interface security, or is derived according to the shared key, the first network element equipment 71 also acquires the first key, and derives according to the identifier of the UE and the first key to generate the authentication user name and the authentication credential.

When the first key is the shared key of the UE 70 and the second network element equipment in the accessed mobile communication network when implementing the air interface security, or is derived according to the shared key, at this time, the first network element equipment 71 also acquires the authentication user name and the authentication credential from the second network element equipment; the authentication user name and the authentication credential are generated by deriving according to the identifier of the UE and the first key by the second network element equipment. Or the first network element equipment 71 also acquires the identifier of the UE and the first key from the second network element equipment, while the first network element equipment derives according to the identifier of the UE and the first key to generate the authentication user name and the authentication credential. The first network element equipment 71 and the second network element equipment are communicated with each other.

In the above-mentioned solution, the UE 70 and the first network element equipment 71 both acquire the authentication user name and the authentication credential, then the UE 70 and the first network element equipment 71 implement EAP authentication according to the authentication user name and the authentication credential, and after the authentication is completed, the first network element equipment 71 sends authentication complete to the WLAN node equipment 72, for indicating the UE 70 to establish secure connection with the WLAN node equipment 72. When the UE 70 and the first network element equipment 71 implement the EAP authentication, the WLAN node equipment 72 forwards an authentication message, and reference may be made to related prior art for the authentication message involved during the EAP authentication specifically.

Optionally, the UE 70 in this embodiment may specifically adopt the UE of the embodiment as shown in the above-mentioned FIG. 11, the first network element equipment 71 in this embodiment may specifically adopt the network element equipment of the embodiment as shown in the above-mentioned FIG. 14. And the secure establishment of the WLAN may be implemented by adopting the technical solutions of the embodiments as shown in the above-mentioned FIG. 6 to FIG. 7 and corresponding subsequent optional embodiments, and reference may be made to recordings in the above-mentioned related embodiments for details which will not be repeated redundantly herein.

According to the secure establishment system of the WLAN of this embodiment, by adopting the above-mentioned UE, WLAN node equipment and network element equipment, the UE may derive according to the identifier of the UE and the first key to generate the authentication user name and the authentication credential; the UE implements the EAP authentication with the network element equipment in the mobile communication network to which the UE is accessed according to the authentication user name and the authentication credential, and secure connection is established between the UE and the WLAN node after the authentication is completed; wherein the first key is the shared key of the user equipment and the network element equipment in the accessed mobile communication network when implementing the air interface security or is derived according to the shared key. By adopting the above-mentioned technical solution of this embodiment, the defects in the prior art may be overcome that the WLAN works under an open node, no secure connection is established between the UE and the WLAN node, and data between the UE and the WLAN node is transmitted in a plaintext mode to result in poor communication security between the UE and the WLAN node. By adopting the technical solution of the embodiment of the present invention, the secure connection may be established between the UE and the WLAN node, thus improving the communication security between the UE and the WLAN node.

The device embodiments described above are merely exemplary, wherein units described as separate components may be separated physically or not, components displayed as units may be physical units or not, namely, may be located in one place, or may be distributed on at least two network units. A part or all of the modules may be selected to achieve the purposes of the solutions in the embodiments according to actual demand. Those of ordinary skill in the art may understand and implement the embodiments without any creative effort.

Finally, it should be noted that the above-mentioned embodiments are merely used for illustrating the technical solutions of the present invention, rather than limiting them;

although the present invention has been described in detail with reference to the foregoing embodiments, those of ordinary skill in the art should understand that they could still make modifications to the technical solutions recorded in the foregoing embodiments or make equivalent substitutions to a part or all of technical features therein; and these modifications or substitutions do not make the essence of the corresponding technical solutions depart from the scope of the technical solutions of the embodiments of the present invention.

What is claimed is:

1. A method of establishing a secure connection in a wireless local area network, comprising:
    acquiring, by a user equipment, a first key, wherein the first key is one of the following two keys:
        a shared key of the user equipment and a network element equipment in a mobile communication network which the user equipment accesses when implementing air interface security, and
        a key derived according to the shared key of the user equipment and the network element equipment in the accessed mobile communication network when implementing the air interface security;
    and the first key is used to encrypt communications in the mobile communication network;
    deriving, by the user equipment, according to the first key and a derivation parameter a first derivation key, wherein the derivation parameter is determined by consultation between the user equipment and the network element equipment which is accessed by the user equipment; and
    establishing, by the user equipment, according to the first derivation key, a secure connection with a wireless local area network node acquiring a second derivation key, wherein the second derivation key acquired by the wireless local area network node is the same as the first derivation key acquired by the user equipment, wherein the secure connection with the wireless local area network node is established in a wireless local area network different from the mobile communication network.

2. The method of claim 1, wherein before the establishing, the method further comprises:
    sending, by the user equipment, an identifier of the user equipment to the wireless local area network node, to enable the wireless local area network node to request the network element equipment to acquire the second derivation key corresponding to the user equipment according to the identifier of the user equipment.

3. The method of claim 1, wherein
    the deriving, by the user equipment, according to the first key and a derivation parameter to acquire a first derivation key, comprises: deriving, by the user equipment, according to the first key and the derivation parameter a second key; and
    the establishing, by the user equipment, the secure connection with a wireless local area network node according to the first derivation key, comprises: establishing, by the user equipment, the secure connection with the wireless local area network node according to the second key.

4. The method of claim 1, wherein
    the deriving, by the user equipment, according to the first key and a derivation parameter to acquire a first derivation key, comprises: deriving, by the user equipment, according to the first key and the derivation parameter a second key; deriving, by the user equipment, according to the second key and an identifier of the wireless local area network node a third key; and
    the establishing, by the user equipment, the secure connection with a wireless local area network node according to the first derivation key, comprises: establishing, by the user equipment, the secure connection with the wireless local area network node according to the third key.

5. The method of claim 1, wherein the identifier of the user equipment is a media access control address of a wireless local area network interface of the user equipment, an international mobile subscriber identification number of the user equipment, a temporary mobile subscription identity of the user equipment, a packet temporary mobile subscription identity of the user equipment, a globally unique temporary identity of the user equipment, a system architecture evolution temporary mobile subscriber identity of the user equipment, a radio network temporary identifier of the user equipment, or a mobile station international integrated services digital network number of the user equipment.

6. The method of claim 5, wherein when the identifier of the user equipment is the media access control address of the wireless local area network interface of the user equipment, the method further comprises:
    sending, by the user equipment, the identifier of the user equipment to the network element equipment.

7. The method of claim 6, wherein the sending, by the user equipment, the identifier of the user equipment to the network element equipment, comprises:
    sending, by the user equipment, the identifier of the user equipment to the network element equipment in an encryption manner.

8. The method of claim 7, wherein the sending, by the user equipment, the identifier of the user equipment to the network element equipment in an encryption manner, comprises:
    carrying, by the user equipment, the identifier of the user equipment in an attach complete message, a routing area update message, a tracking area update complete message, a non-access stratum security mode complete message or a capability transfer message; and sending the following encrypted message carrying the identifier of the user equipment to the network element equipment: the attach complete message, the routing area update message, the tracking area update complete message, the non-access stratum security mode complete message or the capability transfer message.

9. A user equipment, comprising a processor and a non-transitory processor-readable medium having processor-executable instructions stored thereon, the processor-executable instructions including a plurality of modules, the modules including:
    an acquiring module, configured to acquire a first key, wherein the first key is one of the following two keys:
        a shared key when implementing air interface security with a network element equipment in a mobile communication network which the user equipment accesses, and
        a key derived according to the shared key of the user equipment and the network element equipment in the accessed mobile communication network when implementing the air interface security;
    and the first key is used to encrypt communications in the mobile communication network;
    a deriving module, configured to derive according to the first key acquired by the acquiring module and a derivation parameter a first derivation key; the derivation parameter is determined by consultation between the user equipment and the network element equipment which is accessed by the user equipment; and an establishing module, configured to establish a secure connection with a wireless local area network node acquiring a second derivation key according to the first derivation key derived by the deriving module, wherein the second derivation key acquired by the wireless local area network node is the same as the first derivation key acquired by the user equipment, wherein the secure connection with the wireless local area network node is established in a wireless local area network different from the mobile communication network.

10. The equipment of claim 9, further comprising:
a sending module, configured to send an identifier of the user equipment to the wireless local area network node, to enable the wireless local area network node to request the network element equipment to acquire the second derivation key corresponding to the user equipment according to the identifier of the user equipment.

11. The equipment of claim 9, wherein
the deriving module is configured to derive according to the first key acquired by the acquiring module and the derivation parameter a second key; and
the establishing module is configured to establish secure connection with the wireless local area network node according to the second key derived by the deriving module.

12. The equipment of claim 9, wherein
the deriving module is configured to derive according to the first key acquired by the acquiring module and the derivation parameter a second key, and derive according to the second key and an identifier of the wireless local area network node a third key; and
the establishing module is configured to establish secure connection with the wireless local area network node according to the third key derived by the deriving module.

13. The equipment of claim 9, wherein the identifier of the user equipment sent by the sending module is a media access control address of a wireless local area network interface of the user equipment, an international mobile subscriber identification number of the user equipment, a temperate mobile subscription identity of the user equipment, a packet temperate mobile subscription identity of the user equipment, a globally unique temporary identity of the user equipment, a system architecture evolution temporary mobile subscriber identity of the user equipment, a radio network temporary identifier of the user equipment, or a mobile station international integrated services digital network number of the user equipment.

14. The equipment of claim 13, wherein
the sending module is further configured to send the identifier of the user equipment to the network element equipment, when the identifier of the user equipment is the media access control address of the wireless local area network interface of the user equipment.

15. The equipment of claim 14, wherein
the sending module is configured to send the identifier of the user equipment to the network element equipment in an encryption manner, when the identifier of the user equipment is the media access control address of the wireless local area network interface of the user equipment.

16. A network element equipment, located in a mobile communication network which is accessed by user equipment, comprising a processor and a non-transitory processor-readable medium having processor-executable instructions stored thereon, the processor-executable instructions including a plurality of modules, the modules including:

a receiving module, configured to receive a key request message sent by a wireless local area network node, wherein the key request message carries an identifier of the user equipment;

an acquiring module, configured to acquire a second derivation key according to the identifier of the user equipment in the key request message received by the receiving module; the second derivation key is acquired by deriving according to a first key and a derivation parameter; the first key is one of the following two keys:
a shared key when implementing air interface security with the user equipment, and
a key derived according to the shared key when implementing the air interface security with the user equipment;
and the first key is used to encrypt communications in the mobile communication network;

the derivation parameter is determined by consultation with the accessing user equipment; and a sending module, configured to send the second derivation key acquired by the acquiring module to the wireless local area network node, to enable the wireless local area network node to establish, based on the derivation key, a secure connection with the user equipment acquiring a first derivation key, wherein the first derivation key acquired by the user equipment is the same as the second derivation key sent by the network element equipment and received by wireless local area network node, wherein the secure connection with the wireless local area network node is established in a wireless local area network different from the mobile communication network.

17. The equipment of claim 16, wherein the acquiring module is further configured to acquire the first key.

18. The equipment of claim 17, further comprising a deriving module and an establishing module; wherein
the deriving module is configured to derive according to the first key and the derivation parameter a second key, after the acquiring module acquires the first key and before acquiring the second derivation key according to the identifier of user equipment in the key request message;
the establishing module is configured to establish a corresponding relationship between the second key derived by the deriving module and the identifier of the user equipment;
the acquiring module is configured to acquire the second key according to the corresponding relationship between the second key and the identifier of the user equipment established by the establishing module and the identifier of the user equipment in the key request message; and
the sending module is configured to send the second key acquired by the acquiring module to the wireless local area network node, for the wireless local area network node to establish secure connection with the user equipment based on the second key.

19. The equipment of claim 17, further comprising a deriving module and an establishing module; wherein
the deriving module is configured to derive according to the first key and the derivation parameter a second key, after the acquiring module acquires the first key and before acquiring the second derivation key according to the identifier of user equipment in the key request message;

the establishing module is configured to establish a corresponding relationship between the second key derived by the deriving module and the identifier of the user equipment;

the acquiring module is configured to acquire the second key according to the corresponding relationship between the second key and the identifier of the user equipment established by the establishing module and the identifier of the user equipment in the key request message; and acquire according to the second key and an identifier of the wireless local area network node in the key request message the third key; and the sending module is configured to send the third key acquired by the acquiring module to the wireless local area network node, for the wireless local area network node to establish a secure connection with the user equipment based on the third key.

20. The equipment of claim 16, wherein the identifier of the user equipment received by the receiving module is a media access control address of a wireless local area network interface of the user equipment, an international mobile subscriber identification number of the user equipment, a temperate mobile subscription identity of the user equipment, a packet temperate mobile subscription identity of the user equipment, a globally unique temporary identity of the user equipment, a system architecture evolution temporary mobile subscriber identity of the user equipment, a radio network temporary identifier of the user equipment, or a mobile station international integrated services digital network number of the user equipment.

* * * * *